United States Patent
Insolia et al.

(10) Patent No.: US 9,865,023 B2
(45) Date of Patent: Jan. 9, 2018

(54) METHODS OF CREATING CUSTOMIZED BEVERAGE PRODUCTS

(75) Inventors: Gerard E. Insolia, Atlanta, GA (US); Hubertus Ulrich Schubert, Smyrna, GA (US); James E. Goldman, Dunwoody, GA (US); Fred F. Sadeghi, Marietta, GA (US); Nilang Patel, Mableton, GA (US); Brock Kolls, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 1047 days.

(21) Appl. No.: 12/365,666

(22) Filed: Feb. 4, 2009

(65) Prior Publication Data

US 2010/0030355 A1    Feb. 4, 2010

Related U.S. Application Data

(60) Provisional application No. 61/025,897, filed on Feb. 4, 2008.

(51) Int. Cl.
*G06Q 30/00* (2012.01)
*G06Q 50/04* (2012.01)
*G06Q 30/06* (2012.01)

(52) U.S. Cl.
CPC ......... *G06Q 50/04* (2013.01); *G06Q 30/0601* (2013.01); *G06Q 30/0603* (2013.01); *Y02P 90/30* (2015.11)

(58) Field of Classification Search
CPC combination set(s) only.
See application file for complete search history.

(56) References Cited

U.S. PATENT DOCUMENTS

| 574,444 A | 1/1897 | Nickerson |
|---|---|---|
| 997,933 A | 7/1911 | Musso |

(Continued)

FOREIGN PATENT DOCUMENTS

| BE | 901407 | 12/1983 |
|---|---|---|
| CA | 2568246 A1 | 2/2001 |

(Continued)

OTHER PUBLICATIONS

International Search Report and Written Opinion mailed for PCT/US09/033065 dated Dec. 23, 2009.

(Continued)

*Primary Examiner* — Fateh M Obaid
(74) *Attorney, Agent, or Firm* — Eversheds Sutherland (US) LLP

(57) ABSTRACT

A method of creating customized beverage products includes providing a multiple stream filing system suited for producing an array of beverage products. The method also includes receiving an order for a customized beverage product from the array of beverage products. The order indicates at least one characteristic of the customized beverage product. The at least one characteristic comprises one or more of the following: a beverage formulation, a beverage additive, a package size, a package shape, or label content. The method further includes instructing the multiple stream filling system to produce the customized beverage product. The multiple stream filing system produces the customized beverage product without performing an operation to reduce contamination of the customized beverage product with ingredients from a previously produced beverage product.

11 Claims, 23 Drawing Sheets

(56) References Cited

U.S. PATENT DOCUMENTS

| | | |
|---|---|---|
| 1,262,880 A | 4/1918 | Newton |
| 952,903 A | 3/1920 | Hicks |
| 1,483,861 A | 2/1924 | Heulings |
| 2,232,273 A | 2/1941 | Risser |
| 2,353,519 A | 7/1944 | Spurr |
| 3,172,436 A | 3/1964 | Wilhere et al. |
| 3,335,767 A | 8/1967 | Manas |
| 3,349,815 A | 10/1967 | Baets |
| 3,364,959 A | 1/1968 | Hamilton et al. |
| 3,991,911 A | 11/1976 | Shannon et al. |
| 4,053,003 A | 10/1977 | Ferrero et al. |
| 4,628,974 A | 12/1986 | Meyer |
| 4,821,925 A | 4/1989 | Wiley et al. |
| 4,871,262 A | 10/1989 | Krauss et al. |
| 4,938,387 A | 7/1990 | Kervefor et al. |
| 4,941,596 A | 7/1990 | Marty et al. |
| 4,961,864 A * | 10/1990 | Bruke .................. B01D 29/03 210/159 |
| 5,000,345 A | 3/1991 | Brogna et al. |
| 5,027,869 A | 7/1991 | Tsumura et al. |
| 5,058,630 A | 10/1991 | Wiley et al. |
| 5,083,591 A | 1/1992 | Edwards et al. |
| 5,228,594 A | 7/1993 | Aslin |
| 5,235,509 A | 8/1993 | Mueller et al. |
| 5,319,911 A * | 6/1994 | Wilhite .................. A01D 51/00 56/12.8 |
| 5,338,705 A * | 8/1994 | Harris .................... H01L 24/50 257/E21.509 |
| 5,474,211 A | 12/1995 | Hellenberg |
| 5,558,249 A | 9/1996 | Falcoff |
| 5,707,212 A | 1/1998 | Matthews |
| 5,725,125 A * | 3/1998 | Bessette et al. .................. 222/1 |
| 5,778,761 A * | 7/1998 | Miller ............................ 99/275 |
| 5,865,226 A | 2/1999 | Sweeney |
| 5,931,343 A | 8/1999 | Topar et al. |
| 5,950,691 A | 9/1999 | Abe et al. |
| 5,969,605 A * | 10/1999 | McIntyre .............. B07C 5/3404 209/549 |
| 5,996,650 A | 12/1999 | Phallen et al. |
| 6,013,228 A * | 1/2000 | Achter ...................... B07C 5/34 209/3.1 |
| 6,119,434 A | 9/2000 | Andersson |
| 6,170,540 B1 | 1/2001 | Romero |
| 6,186,193 B1 | 2/2001 | Phallen et al. |
| 6,394,312 B1 | 5/2002 | Endou |
| 6,446,834 B2 | 9/2002 | Davis et al. |
| 6,607,013 B1 | 8/2003 | Leoni |
| 6,726,947 B1 * | 4/2004 | Gutwein et al. .............. 426/433 |
| 6,729,361 B2 | 5/2004 | Noell |
| 6,742,552 B2 | 6/2004 | Raniwala |
| 6,751,525 B1 | 6/2004 | Crisp, III |
| 6,759,072 B1 * | 7/2004 | Gutwein et al. .............. 426/433 |
| 6,761,191 B2 | 7/2004 | Rosen et al. |
| 6,766,656 B1 | 7/2004 | Crisp, III et al. |
| 6,863,092 B2 | 3/2005 | Seiver et al. |
| 6,918,417 B2 | 7/2005 | Bernhard |
| 7,000,656 B2 | 2/2006 | Todd |
| 7,077,290 B2 | 7/2006 | Bethuy et al. |
| 7,203,572 B2 | 4/2007 | Crisp, III |
| 7,243,818 B2 | 7/2007 | Jones |
| 7,320,416 B2 | 1/2008 | Miller et al. |
| 7,325,485 B2 | 2/2008 | Carhuff et al. |
| 7,331,483 B2 | 2/2008 | Bhimani |
| 7,337,920 B2 | 3/2008 | Duck et al. |
| 7,340,417 B2 * | 3/2008 | Kaufman et al. .................. 705/26 |
| 7,347,344 B2 | 3/2008 | Engels et al. |
| 7,353,080 B2 | 4/2008 | Walker et al. |
| 7,762,181 B2 * | 7/2010 | Boland et al. .................. 99/322 |
| 7,776,372 B2 * | 8/2010 | Hrudka ......................... 426/233 |
| 2001/0017815 A1 | 8/2001 | Ackermann et al. |
| 2001/0029995 A1 | 10/2001 | Heller et al. |
| 2002/0004749 A1 * | 1/2002 | Froseth et al. .................. 705/16 |
| 2002/0011277 A1 | 1/2002 | Castillo |
| 2002/0139436 A1 | 10/2002 | Rosen et al. |
| 2002/0193951 A1 * | 12/2002 | Maruyama .............. G01M 3/40 702/51 |
| 2003/0075233 A1 | 4/2003 | Hewlitt et al. |
| 2003/0121561 A1 | 7/2003 | Wagner et al. |
| 2003/0136461 A1 | 7/2003 | Lohr |
| 2003/0150514 A1 | 8/2003 | DeVillele |
| 2004/0089373 A1 | 5/2004 | Seiver et al. |
| 2004/0202757 A1 * | 10/2004 | Gutwein et al. .............. 426/433 |
| 2005/0023300 A1 | 2/2005 | Schultz |
| 2005/0029287 A1 | 2/2005 | Mobbs |
| 2005/0034779 A1 | 2/2005 | Bernhard |
| 2005/0072510 A1 * | 4/2005 | Navarro ................ B29C 63/423 156/64 |
| 2005/0092386 A1 | 5/2005 | Kaufhold et al. |
| 2005/0100457 A1 | 5/2005 | Fugere |
| 2005/0236429 A1 | 10/2005 | Duck et al. |
| 2006/0000851 A1 | 1/2006 | Girard et al. |
| 2006/0086760 A1 | 4/2006 | Cohen et al. |
| 2006/0147313 A1 | 7/2006 | Zengerle et al. |
| 2006/0157504 A1 | 7/2006 | Barker et al. |
| 2006/0188620 A1 * | 8/2006 | Gutwein et al. .............. 426/433 |
| 2006/0231445 A1 * | 10/2006 | Watson ...................... 206/459.1 |
| 2006/0286261 A1 | 12/2006 | Wu et al. |
| 2007/0073557 A1 | 3/2007 | Abramson |
| 2007/0095017 A1 | 5/2007 | Menke |
| 2007/0114243 A1 | 5/2007 | Kershaw et al. |
| 2007/0166445 A1 | 7/2007 | Ivano |
| 2007/0251260 A1 | 11/2007 | Baxter et al. |
| 2007/0255450 A1 | 11/2007 | Mazur et al. |
| 2007/0258851 A1 | 11/2007 | Fogg et al. |
| 2007/0267096 A1 * | 11/2007 | Uriel ........................ B65B 43/52 141/165 |
| 2007/0271876 A1 | 11/2007 | Davies |
| 2007/0272317 A1 | 11/2007 | Klopfenstein et al. |
| 2007/0275125 A1 | 11/2007 | Catani |
| 2007/0294129 A1 * | 12/2007 | Froseth et al. .................. 705/10 |
| 2008/0004973 A1 * | 1/2008 | Rothschild ...................... 705/26 |
| 2008/0020115 A1 | 1/2008 | Guerrero et al. |
| 2008/0023099 A1 | 1/2008 | Schubert et al. |
| 2008/0023488 A1 | 1/2008 | Guerrero et al. |
| 2008/0029541 A1 | 2/2008 | Wallace et al. |
| 2008/0041876 A1 | 2/2008 | Frank et al. |
| 2008/0116262 A1 | 5/2008 | Majer |
| 2008/0142548 A1 | 6/2008 | Moen et al. |
| 2008/0152778 A1 | 6/2008 | Kosugi et al. |
| 2008/0160142 A1 * | 7/2008 | Khulusi ........................ 426/115 |
| 2008/0271809 A1 | 11/2008 | Goldman et al. |
| 2009/0188938 A1 * | 7/2009 | Farris et al. ...................... 222/1 |
| 2009/0204473 A1 * | 8/2009 | Sommerfeld ................... 705/10 |

FOREIGN PATENT DOCUMENTS

| | | |
|---|---|---|
| CN | 1401549 A | 3/2003 |
| CN | 1494854 A | 5/2004 |
| DE | 2516329 A1 | 4/1975 |
| DE | 4016095 A1 | 11/1990 |
| EP | 0223643 A1 | 5/1987 |
| EP | 1132337 | 9/2001 |
| EP | 1905730 A1 | 4/2008 |
| FR | 2615845 A1 | 12/1988 |
| FR | 2624844 A1 | 6/1989 |
| FR | 2877745 A1 | 5/2006 |
| GB | 2442223 | 4/2008 |
| JP | 1199801 | 8/1989 |
| JP | 2219702 | 9/1990 |
| JP | 5032292 | 2/1993 |
| JP | 5223627 | 8/1993 |
| JP | 06241172 | 8/1994 |
| JP | 7037575 | 2/1995 |
| JP | 7096905 | 4/1995 |
| JP | 7112703 | 5/1995 |
| JP | 07187102 | 7/1995 |
| JP | 8285657 | 1/1996 |
| JP | 10152103 | 6/1998 |
| JP | 10218103 | 8/1998 |
| JP | 10305802 | 11/1998 |
| JP | 2000006907 | 1/2000 |
| JP | 2000159202 | 6/2000 |
| JP | 2000168703 | 6/2000 |

(56) References Cited

FOREIGN PATENT DOCUMENTS

| | | |
|---|---|---|
| JP | 2000238703 | 9/2000 |
| JP | 3078631 | 7/2001 |
| JP | 2001287703 | 10/2001 |
| JP | 2002308203 | 10/2002 |
| JP | 2003175997 | 6/2003 |
| JP | 2004004053 | 1/2004 |
| JP | 2004123235 | 4/2004 |
| JP | 3712731 B2 | 11/2005 |
| JP | 2006051977 | 2/2006 |
| JP | 3124230 | 7/2006 |
| JP | 2006206101 | 8/2006 |
| WO | 8504157 | 9/1985 |
| WO | 8907294 | 8/1989 |
| WO | 200058200 | 10/2000 |
| WO | 0209228 A1 | 1/2002 |
| WO | 02/057178 | 7/2002 |
| WO | 2003031265 | 4/2003 |
| WO | 03054392 A1 | 7/2003 |
| WO | 03078935 A1 | 9/2003 |
| WO | 03097516 A1 | 11/2003 |
| WO | 2005017356 A1 | 2/2005 |
| WO | 2005025988 A2 | 3/2005 |
| WO | 2005/070816 | 8/2005 |
| WO | 2006101394 A2 | 9/2006 |
| WO | 2006131431 A1 | 12/2006 |
| WO | 2007011830 | 1/2007 |
| WO | 2007/070032 | 6/2007 |
| WO | 2007070032 A1 | 6/2007 |
| WO | 2008/015097 A2 | 2/2008 |
| WO | 2008112414 A2 | 9/2008 |
| WO | 2009032946 A1 | 3/2009 |
| WO | 2009100123 A2 | 8/2009 |

OTHER PUBLICATIONS

International Preliminary Report on Patentability for PCT/US2009/033065 dated May 17, 2010.
International Preliminary Report on Patentability for PCT/US2008/054862 dated Jul. 6, 2009.
English translation of the text of the third Chinese Patent Office Action for Application No. CN 200980104069.6 dated Feb. 12, 2015.

* cited by examiner

300

200

200

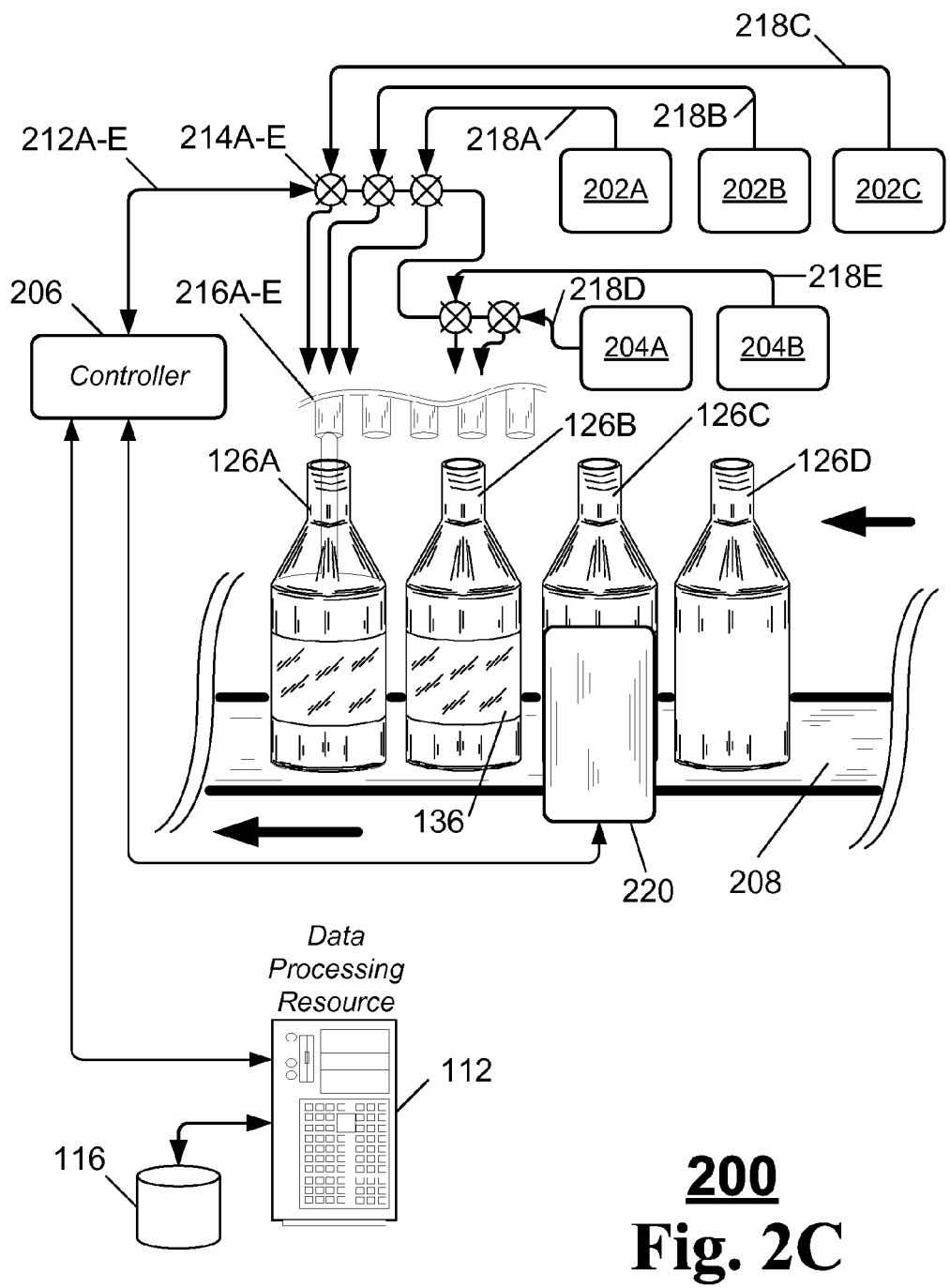

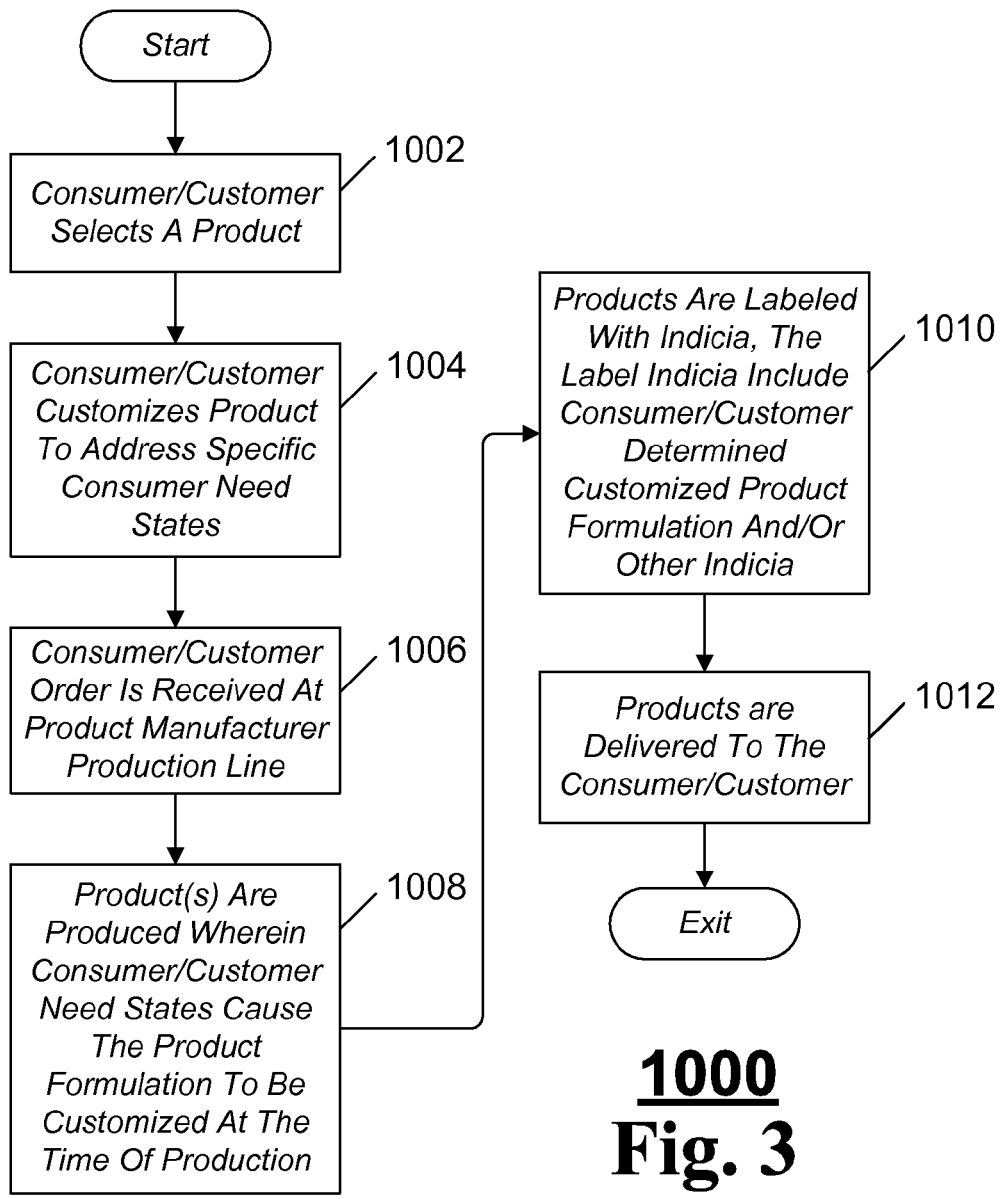

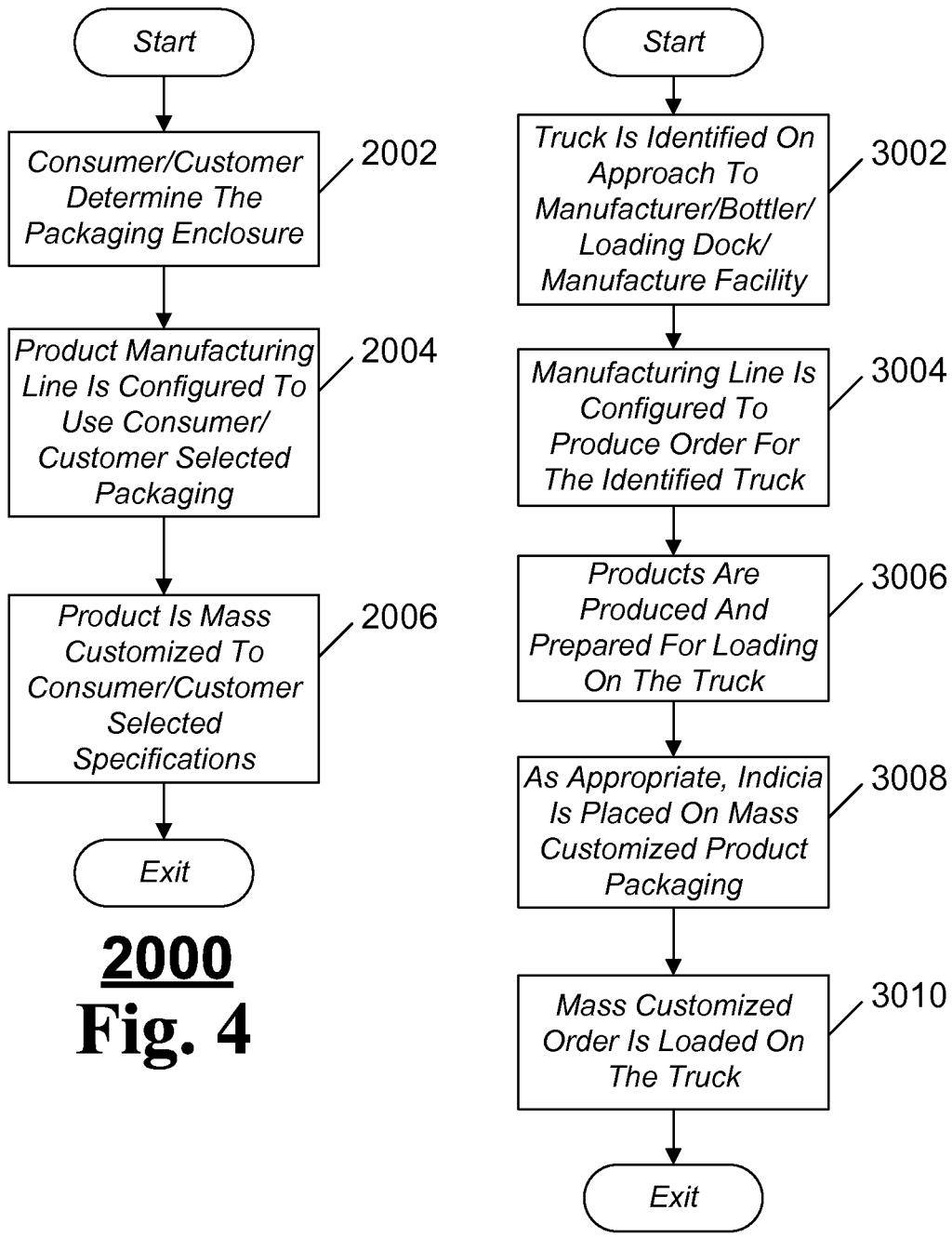

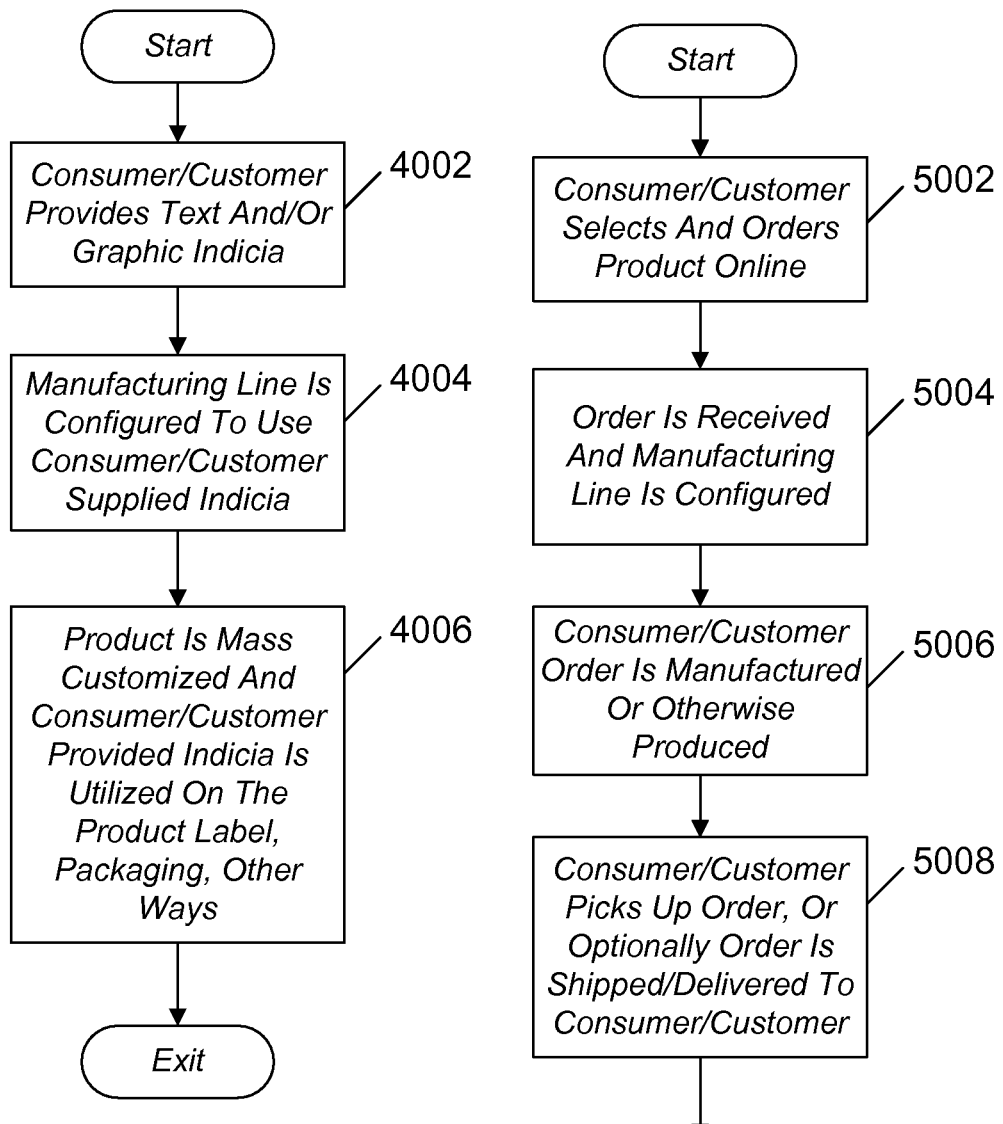

6000

7000

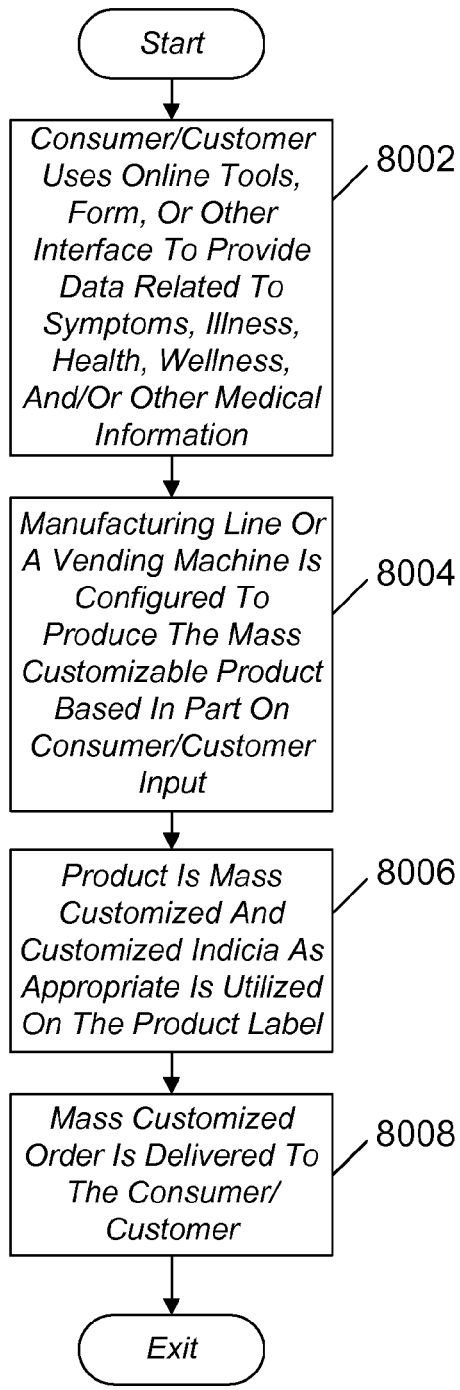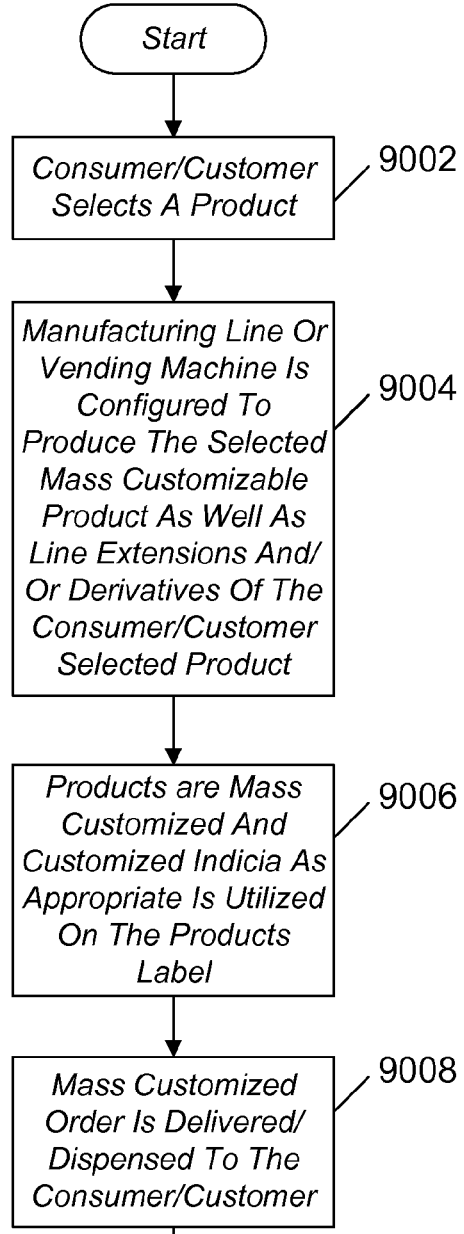
8000
Fig. 10
9000
Fig. 11

10000

11000

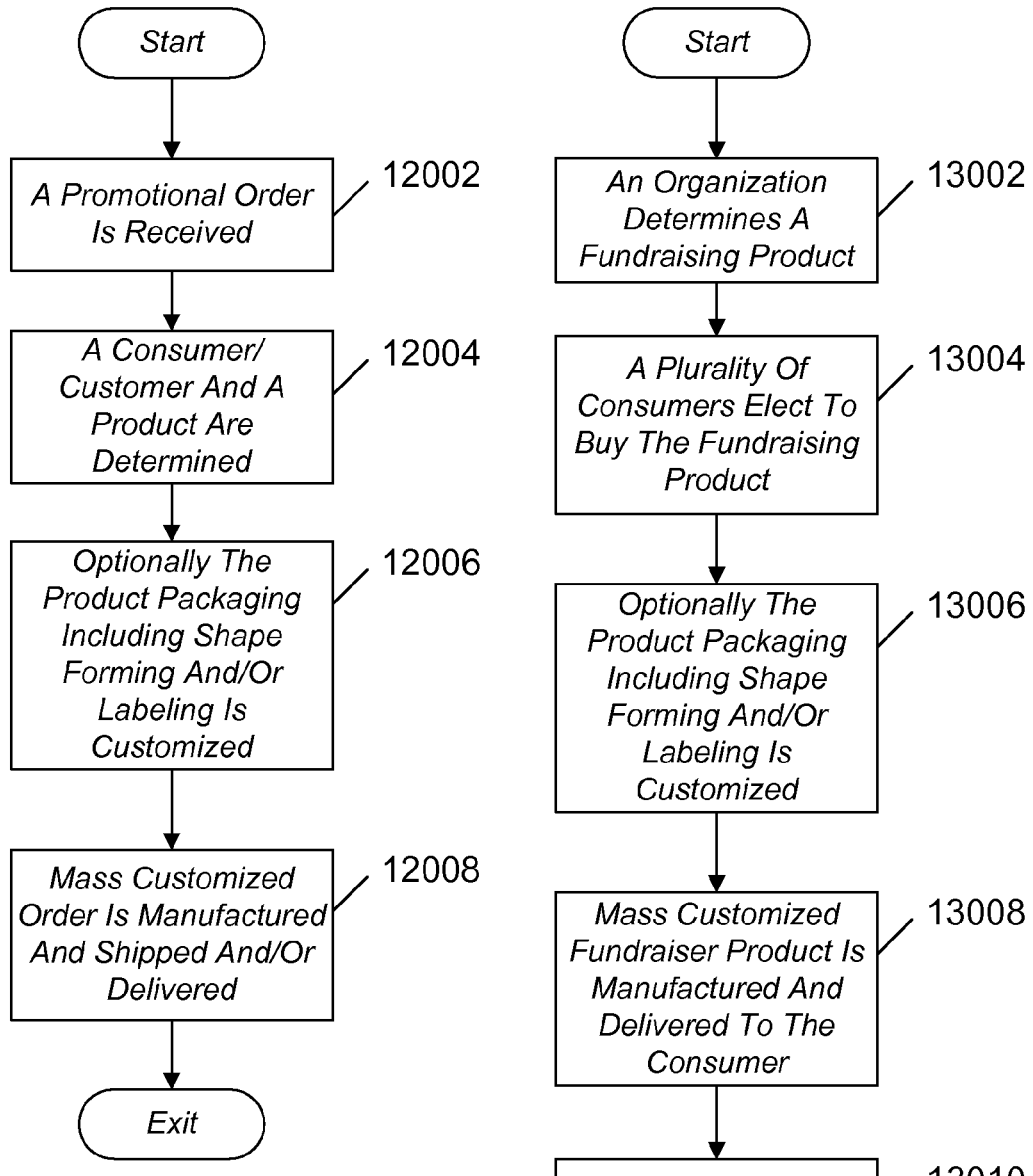

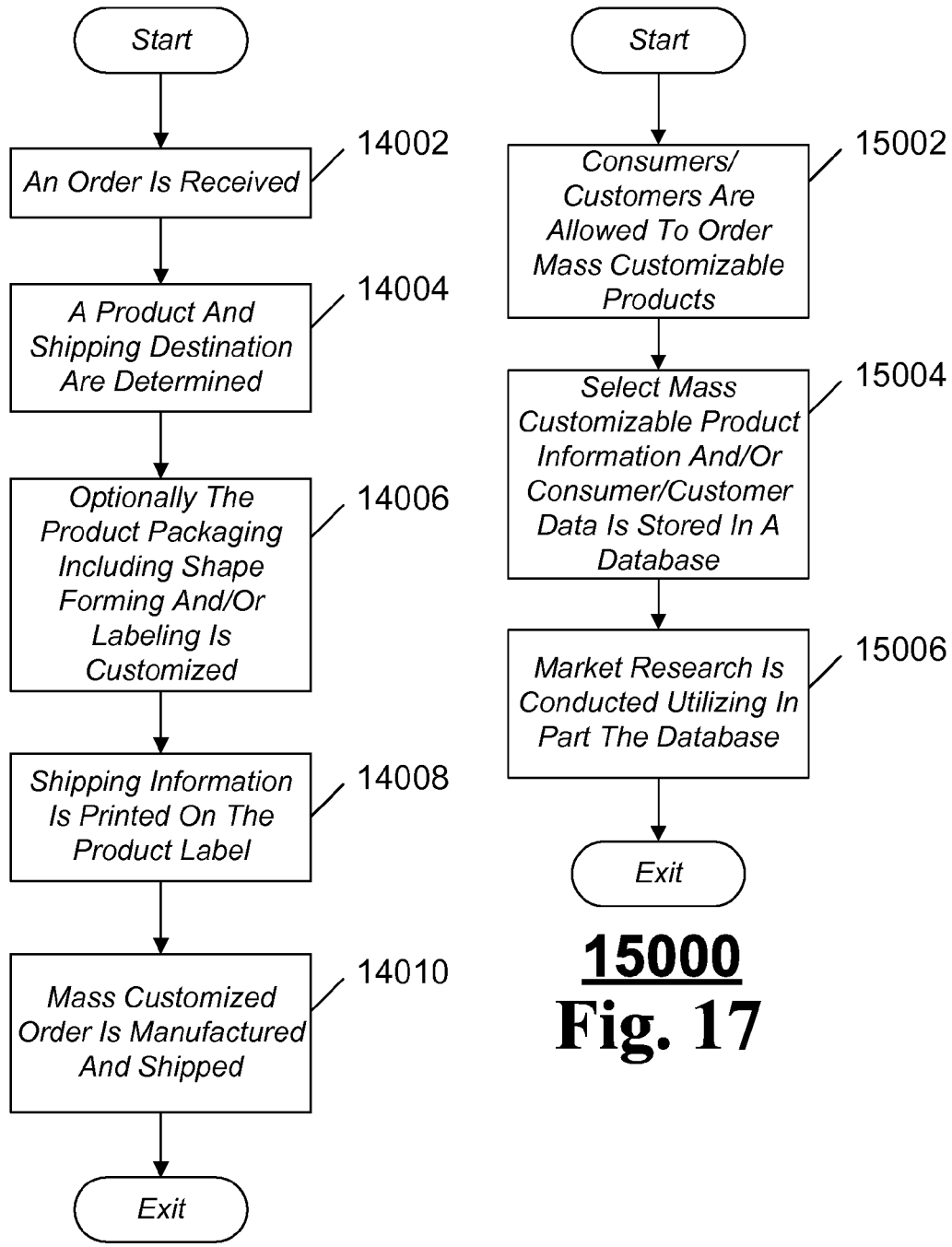

METHODS OF CREATING CUSTOMIZED BEVERAGE PRODUCTS

CROSS-REFERENCE TO RELATED APPLICATIONS

This application claims priority to co-pending U.S. Provisional Application Ser. No. 61/025,897 entitled "Method of Fundraising Using Mass Customized Products," filed Feb. 4, 2008, which is incorporated herein by reference in its entirety.

TECHNICAL FIELD

The present disclosure generally relates to methods of creating customized beverage products, and more particularly relates to methods of creating beverages products that are manufactured using a multiple stream filing system.

BACKGROUND OF THE INVENTION

A consumer's choice of products has been limited to what was on the shelf in a store, or limited choices in a vending machine. As such, often a consumer must settle for a second or third choice rather then being able to enjoy the product they desire most. This can result in consumers being less than satisfied and disappointed that they cannot get the product they want.

As the number and different kinds of products being marketed rapidly increases, as example the number of different kinds of beverages, consumer preferences for variety and easy accessibility also continue to grow. This growth in variety and accessibility results in more and more frustrated consumers as it becomes harder and more difficult to stock every type and kind of product. Regarding beverages, for example, a store or vending machine may not stock every line extension and derivative of a particular beverage brand. For example, a cola beverage brand may have line extensions and derivatives that include a corresponding vanilla cola beverage, a cherry cola beverage, a lime cola beverage, a diet cola beverage, and a zero-calorie, sweetened cola beverage. Often due to shelf space limitations and vending machine capacities, a consumer may have to go without their favorite drink and instead have to settle for something else or not make a purchase at all.

From a manufacturing perspective, trying to manufacture the increasing number of products, line extensions, and derivative product has its own challenges. Changing over a production line to produce one product run at a time is time consuming. The manufacturer may focus on the highest volume products to reduce the number of times a production line needs to be reconfigured for a different product. The consequence to the consumer is that they have fewer choices in the stores and at vending machines as the manufacturer may not produce the smaller volume products in sufficient quantities.

The inability of the consumer to be connected to the manufacturer, coupled with the inability of the manufacturer to produce and deliver to the consumer what the consumer really wants can results in lost sales and consumer dissatisfaction.

While consumers (the people that consume the products) want more choices, customers (the people that sell the products) also want to be able to differentiate their stores and offer customized products. In this regard, a customer who owns a fitness store knows what their consumers want in the way of product but have limited if any capacity to manufacture such products. For example, an owner of a fitness center knows that a customized sports beverage is something that his consumers would like and buy, but the owner has no ability to formulate such a beverage.

With respect to schools, parties, events, activities, fundraisers, organizations and other groups and activities, these customers and consumers could all benefit from the ability to differentiate themselves in the from of customized products. Such differentiation might be custom product formulations, product colors, and custom packaging to name a few. Such differentiation could enable these consumers and customers to effectuate new business models, use or sell new trendy products, and collaborate in business opportunities in new ways. However, currently the inability of these consumers and customers to control the mass customization of products and be able to influence remote manufacturing processes prevents these new business model opportunities from occurring. For these and other reasons, there is a need for methods of creating customized beverage products.

SUMMARY OF THE INVENTION

A method of creating customized beverage products includes providing a multiple stream filing system suited for producing an array of beverage products. The method also includes receiving an order for a customized beverage product from the array of beverage products. The order indicates at least one characteristic of the customized beverage product. The at least one characteristic comprises one or more of the following: a beverage formulation, a beverage additive, a package size, a package shape, or label content. The method further includes instructing the multiple stream filling system to produce the customized beverage product. The multiple stream filing system produces the customized beverage product without performing an operation to reduce contamination of the customized beverage product with ingredients from a previously produced beverage product.

Other systems, devices, methods, features, and advantages of the disclosed systems and methods will be apparent to one with skill in the art upon examination of the following figures and detailed description. All such additional systems, devices, methods, features, and advantages are intended to be included within the description and are intended to be protected by the accompanying claims.

BRIEF DESCRIPTION OF THE FIGURES

The present disclosure may be better understood with reference to the following figures. Matching reference numerals designate corresponding parts throughout the figures, and components in the figures are not necessarily to scale.

FIG. 2C illustrates one example of using consumer/customer supplied text and/or graphic indicia to mass customize product packaging during mass product customization manufacture.

FIG. 3 illustrates one example of a method of customizing a branded beverage for different consumer/customer need states.

FIG. 4 illustrates one example of a method of allowing a consumer to select the type and/or kind of packaging material to use during mass product customization manufacture.

FIG. 5 illustrates one example of a method of preparing a mass customized order upon the detection of a truck approaching a manufacturing facility.

FIG. 6 illustrates one example of a method of using consumer supplied text and/or graphic indicia during the preparation of a mass customized order.

FIG. 7 illustrates one example of a method of a consumer/customer placing a mass customizable order online with order pickup, shipping, or delivery options.

FIG. 10 illustrates one example of a method of obtaining symptoms, illness, health, wellness, and/or other medical information from a consumer and then formulating and mass customizing products for the consumer based in part on the obtained consumer information.

FIG. 11 illustrates one example of a method of allowing a consumer to select a product and then mass customizing a number of line extensions and/or derivative products based in part on the consumer selected product.

FIG. 14 illustrates one example of a method of receiving and filling a mass customizable promotional order.

FIG. 15 illustrates one example of a method of effectuating a fundraising campaign between an organization and a number of consumers/customers utilizing mass customizable product manufacturing.

FIG. 16 illustrates one example of a method of printing shipping information directly on the mass customized product packaging in preparation to shipping the product.

FIG. 17 illustrates one example of a method of collecting marketing data and/or conducting market research by allowing consumers/customers to mass customize products.

DETAILED DESCRIPTION OF THE INVENTION

This application is related to U.S. Nonprovisional Application Ser. No. 11/686,387 entitled "Multiple Stream Filing System," filed Mar. 15, 2007, which is incorporated herein by reference in its entirety.

Figure 1A:
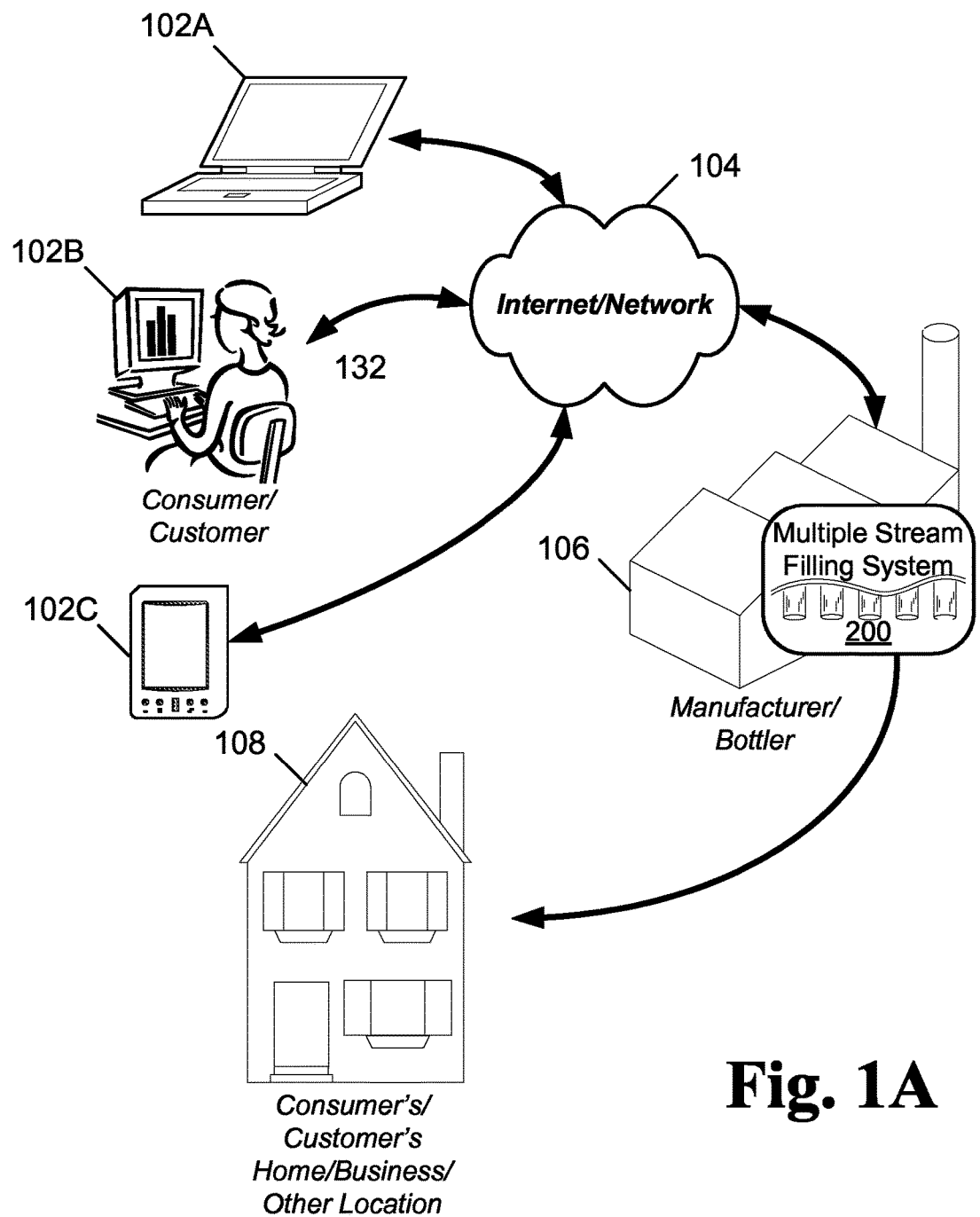
FIG. 1A illustrates one example of an online consumer initiated mass product customization manufacturing with home delivery model.

Turning now to the drawings in greater detail, it will be seen that referring to FIG. 1A there is illustrated one example of an online consumer initiated mass product customization manufacturing with home delivery model. In an exemplary embodiment, a consumer or customer 132 can place an order for mass customizable products via a network 104 by way of computing device 102A, personal computer (PC) 102B, data processing device 102C, and/or by way of other types and kinds of devices and methods as may be required and or desired in a particular embodiment. In this regard, consumer/customer 132 can select a product that combines micro-dosed ingredients with macro-dosed ingredients to form the mass customizable product. The consumer/customer 132 order is then used to configure at a manufacturer/bottler 106 a multiple stream filling system 200 such that the consumer/customer 132 order is produced on the filling line. The completed order can then be delivered to the consumer/customer 132 or other desired location 108. For purposes of disclosure, a manufacturer/bottler 106 can be referred to as a manufacturer 106, bottler 106, or a manufacturing facility.

Manufacturer/bottler 106 manufacturing rates typically range in the tens to thousand of products produced a minute. The ability to mass customize in this type of manufacturing environment enables consumers/customers 132 to order small or large quantities as the multiple stream filling system 200 can easily be configured, production line change over is eliminated, cleaning before product change is eliminated, and product packaging can be customized.

For purposes of disclosure, a consumer can be defined as the buyer of the product and a customer can be defined as a retail partner that is responsible for the sale of the product. A retail store is an example of a customer. As such for purposes of disclosure, a consumer/customer 132 can be either a consumer or a customer. A consumer/customer 132 can also be referred to as a consumer 132 or a customer 132. In addition, for purposes of disclosure a computing device 102A, a personal computer 102B, and a data processing device 102C can be referred to as a data processing device 102. In addition, a data processing device 102C can be a personal data assistant, a wireless phone, a pocket PC, and/or other types and kinds of data processing devices. In addition, a network 104 can be a local area network (LAN), a wide area network (WAN), a wired network connection, a wireless network connection, the Internet, and/or other types and kinds of networks as may be required and or desired in a particular embodiment. Furthermore, a network 104 can be referred to as a global network.

In embodiments, orders can be accepted, used to configure a multiple stream filling system 200, product can be mass customized manufactured to consumer/customer 132 specifications, and the products delivered to a destination 108 of choice.

For example, a consumer 132 that likes a particular brand of diet cola can order different variations of the product tailored for different times in the day. For example, the consumer 132 may desire a diet cola with vitamins and certain nutraceuticals in the morning, a diet cola with energy supplement in the afternoon, and a diet cola with no caffeine in the evening. In this regard, the consumer 132 can place an order that is received at a multiple stream filling system 200 wherein the consumer's 132 mass customized order is processed to produce a week, month, or other time period supply of the different variations of the product. The product is then delivered to the consumer 132.

In another exemplary embodiment, for example and not a limitation, a consumer may have a favorite team or maybe hosting a sports party such as a football championship party and desire to have color coordinated beverage products matching the team colors. In this regard, the consumer 132 can order cases of the mass customized beverage products, for example and not a limitation, selecting the final color of the beverage products. The order can be received at a multiple stream filling system 200 where the mass customized beverage products are produced and subsequently delivered to the consumer 132. For purposes of disclosure, products can be referred to as beverages and/or beverage products.

In another exemplary embodiment, a customer 132 may desire to stock a mass customized beverage in his or her retail store. In this regard, perhaps the storeowner has a specific formulation that is associated with the store. The customer can place a mass customized order for cases of the specially formulated beverage product. The order is received at a multiple stream filling system 200. The beverage product is manufactured and subsequently delivered to the customer 132, wherein the beverage product can be sold in the owner's retail store.

In another exemplary embodiment a consumer/customer 132 can order online products in which health and wellness factors dictate which products are most appropriate, or consumers/customers 132 can sign up for promotions or receive from time to time specials offers. In addition, consumers/customers 132 can sign up to automatically receive new products as they become available, or setup accounts to receive products automatically at special occasions such as anniversaries, birthdays, and/or other types and kinds of occasions. Furthermore, consumers/customers 132 can order mass customized products that are formulated special for favorite teams, tailgate parties, beach parties, and/or other types and kinds of themed occasions. Such special formulation can include color, flavor, and/or other types and kinds of special formulations.

If the product is not available in stores as a standard stocked item, and/or is needed for a special event or activity the consumer/customer 132 can order it, have it manufactured to consumer/customer 132 specifications and delivered to a destination 108 of choice or picked-up by the consumer/customer 132.

Figure 1B:
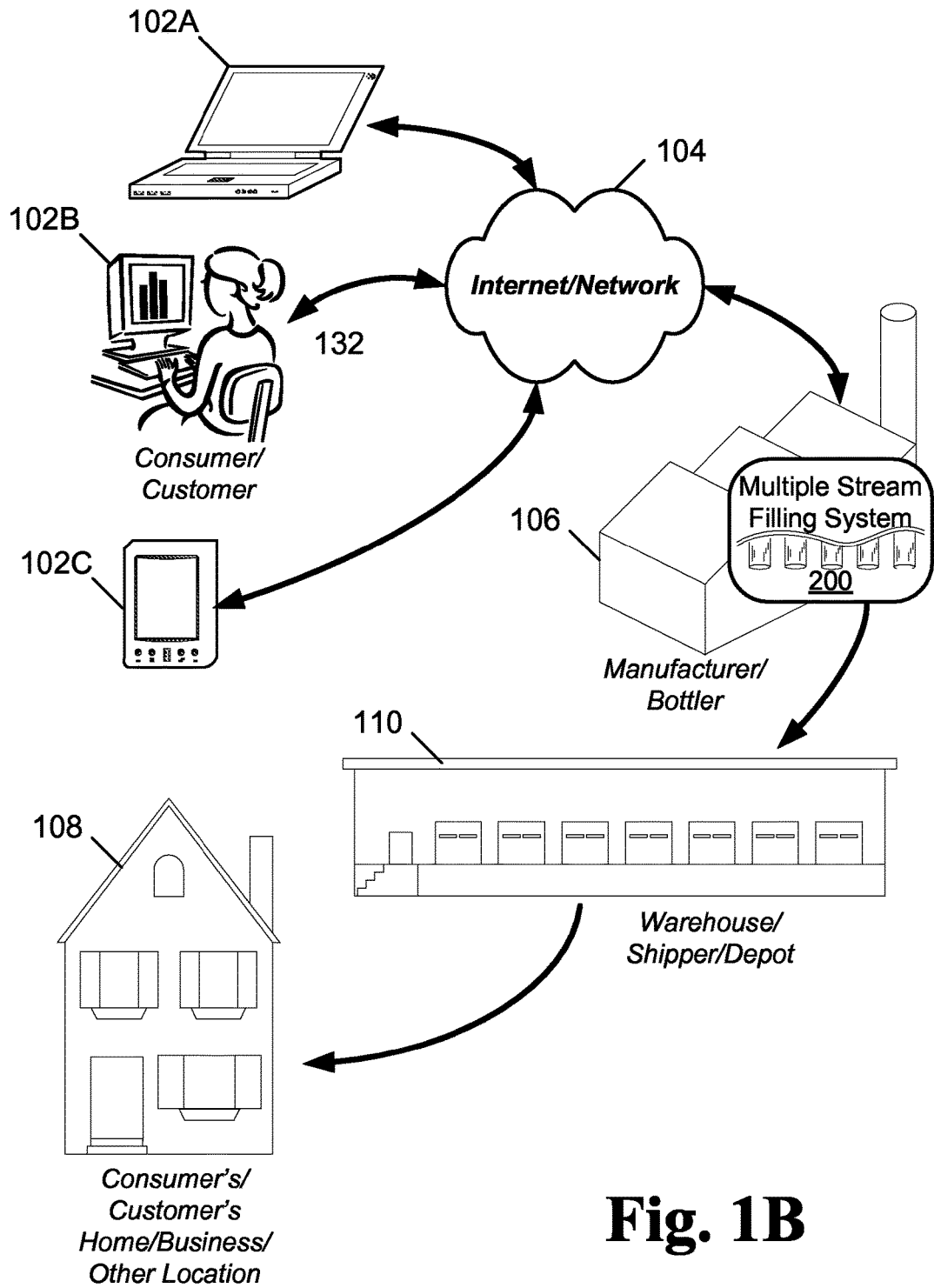
FIG. 1B illustrates one example of an online consumer initiated mass product customization manufacturing with home delivery depot distribution model.

Referring to FIG. 1B there is illustrated one example of an online consumer initiated mass product customization manufacturing with home delivery depot distribution model. In an exemplary embodiment, efficiencies in the delivery to consumer/customer 132 models can be realized by transferring the produced mass customized product from many consumer/customer 132 orders from the manufacturer/bottler 106 to a warehouse/shipper/depot 110. In this regard, the manufacturer/bottler 106 may elect to transport many manufactured orders to a warehouse/shipper/depot 106 such as a parcel delivery service or other shipper facility 110. This shipper facility 110 can then be responsible for delivery to the consumer/customer 132 as may be required and or desired in a particular embodiment. Such data processing as necessary can in part be effectuated by way of a network 104.

Figure 1C:
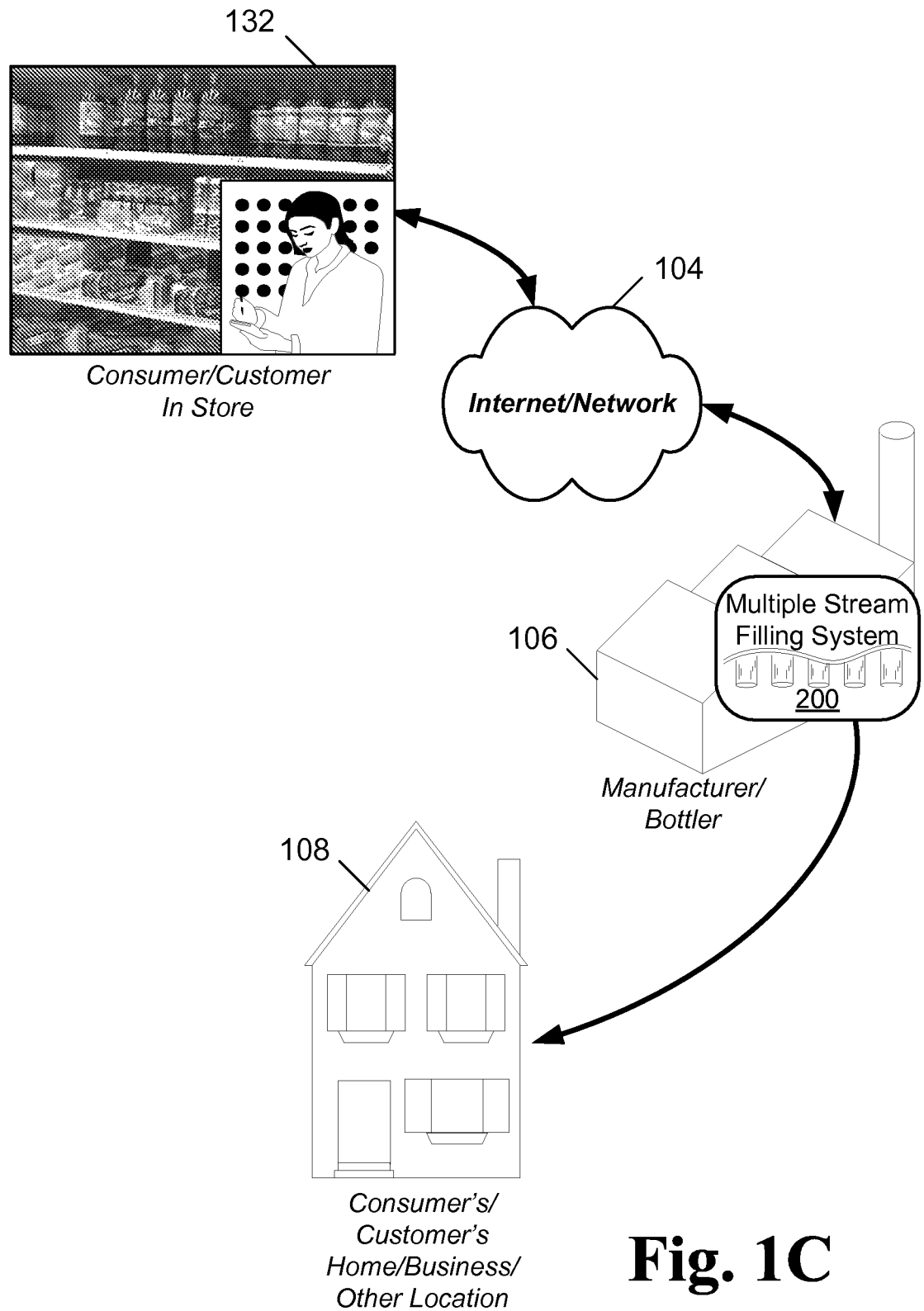
FIG. 1C illustrates one example of an in-store consumer initiated mass product customization manufacturing with home delivery model.

Referring to FIG. 1C there is illustrated one example of an in-store consumer initiated mass product customization manufacturing with home delivery model. In an exemplary embodiment, for example and not a limitation, when a consumer 132 is in a store and does not find the specific type of product that is desired, an order can be placed to have the product mass customized and delivered to the consumer 132 destination 108 of choice. In this regard, an in-store data processing device 102 can enable a consumer 132 to place an order by way of network 104 with the manufacturer/bottler 106. Once the order is received, the manufacturer/bottler 106 can use a multiple stream filling system 200 to mass customize manufacture the consumer 132 order. The order can then be delivered to a consumer 132 destination 108 of choice.

Figure 1D:
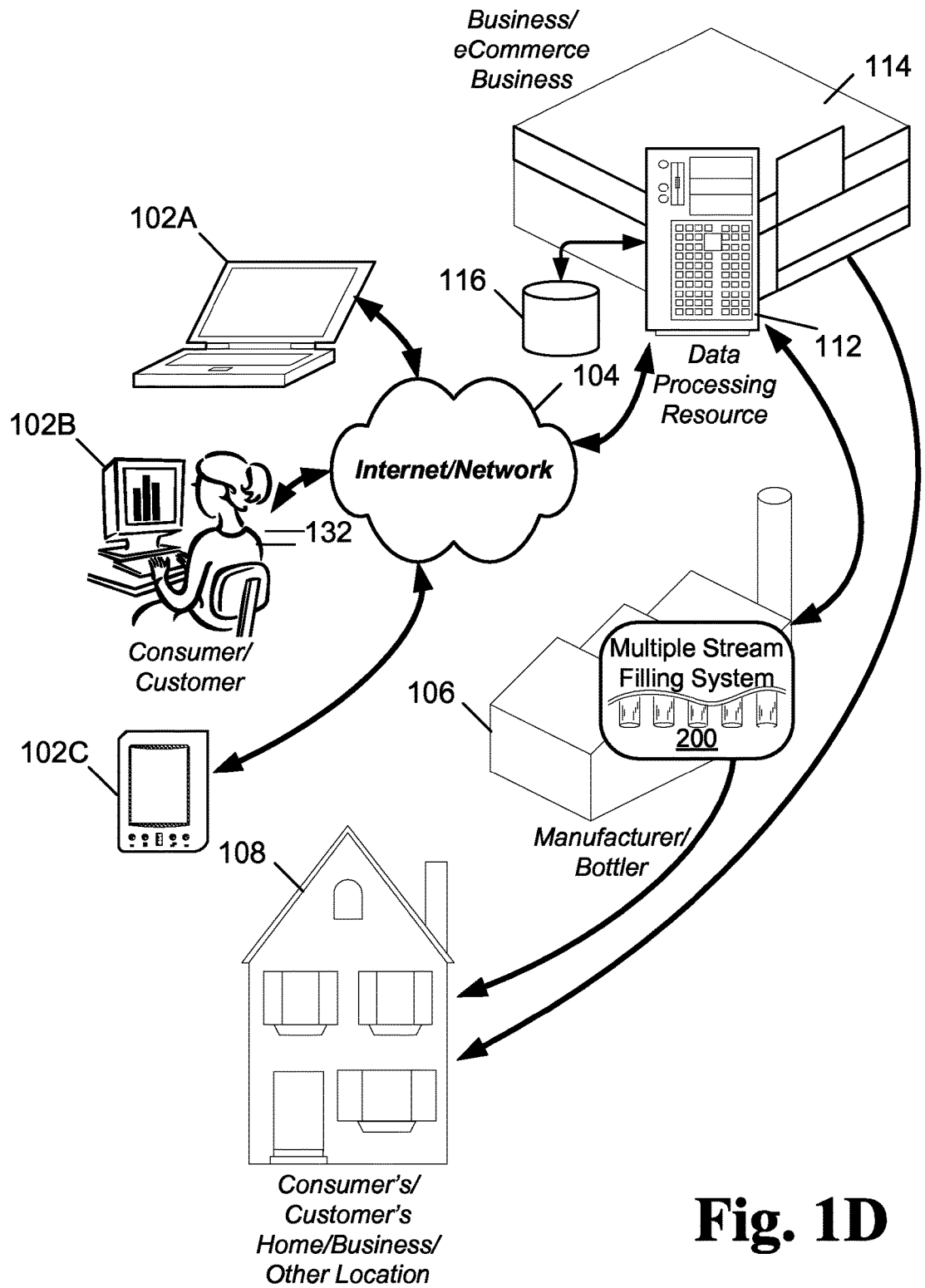
FIG. 1D illustrates one example of a cross promotional mass product customization manufacturing model.

Referring to FIG. 1D there is illustrated one example of a cross-promotional mass product customization manufacturing model. In an exemplary embodiment, a consumer/customer 132 may elect to place an order for a product from a business/ecommerce business 114. In this regard, the consumer/customer 132 can place such orders with the business 114 directly and/or by way of ecommerce. As example and not a limitation, network 104 and data processing equipment 112 and/or database 116 can be utilized to effectuate initial order placement. Then in accordance with a cross promotion the ordering of a product from the business/ecommerce business 114 can trigger an order for a mass customized product from the manufacturer/bottler 106. A multiple stream filling system 200 can be utilized at the manufacturer/bottler to manufacture the mass customized order. Orders from both the business/ecommerce business 114 and the mass customized order from the manufacturer/bottler 106 can then be delivered to the consumer/customer 132 destination 108 of choice.

In an exemplary embodiment, such a promotional order originating from the business/ecommerce business 110 to the manufacturer/bottler 106 can be by way of an electronic order utilizing data processing devices 102, data processing resource 112, database 116, and/or by other methods as may be required and or desired in the particular embodiment. For purposes of disclosure business/ecommerce business 114 can be referred to as business 114 or ecommerce business 114. In addition, data processing resource 112 and database 116 can be a website, online business, and/or other types and kinds of businesses that accept and process electronic orders and/or transact ecommerce.

In an exemplary embodiment, for example and not a limitation, a business 114 could sell exercise shoes. A cross promotional relationship could exist between the business 114 and the manufacturer/bottler 106 such that for every order of exercise shoes a supply of invigorating sports drink, by way of a multiple stream filling system 200, is supplied to the consumer. In operation, a consumer 132 could order shoes in person or online from the business 114. The order would generate a second order in accordance with the cross promotion agreement between the business 114 and the manufacturer/bottler 106. Optionally, the consumer 132 could intervene in the mass customized product specifications. The order for the shoes is processed by the business 114, and the mass customization by way of a multiple stream filling system 200 is manufactured by the manufacturer/bottler 106 and subsequently delivered to a customer 132 destination 108 of choice.

In an exemplary embodiment, a first order can originate from a consumer/customer 132 by way of computing device 102A, personal computer (PC) 102B, and/or data processing device 102C. The first order can be received at a data processing resource 112. A second order can then be generated by way of the data processing resource 112 and received at a manufacturer/bottler 106. The first order can be processed by the business 114 and delivered to the consumer/customer 132. The second order can be processed by the manufacturer/bottler 106 who uses a multiple stream filling system 200 to produce the mass customized product referenced in the second order. The mass customized product is then delivered to the consumer/customer 132.

Figure 1E:
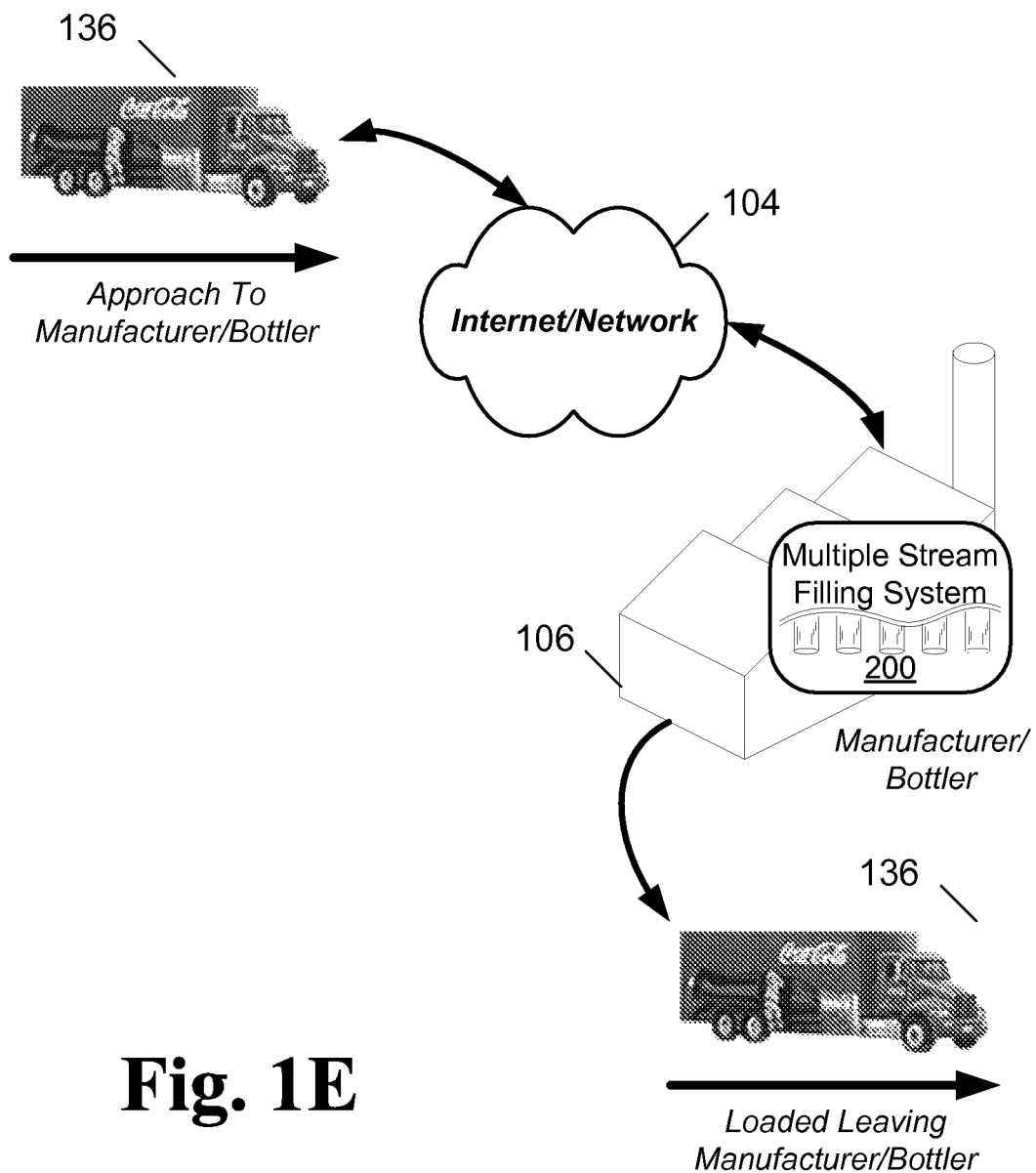
FIG. 1E illustrates one example of a just in time mass product customization manufacturing model.

Referring to FIG. 1E there is illustrated one example of a just in time mass product customization manufacturing model. In an exemplary embodiment, a delivery truck 136 on approach to the manufacturer/bottler 106 can data communicate, by way of a network 104, estimated time of arrival, truck 136 data, and/or other types and kinds of data as may be required and or desired in a particular embodiment. This data can be received, data processed, used to obtain other data, and or otherwise utilized at the manufacturer/bottler 106. In this regard, a multiple stream filling system 200 can be configured and a mass customized order manufactured, being tailored to the load that is to be placed on the approaching truck 136. Upon the truck 136 arrival to the manufacturer/bottler 106 the just in time manufactured mass customized order can be loaded onto the truck 136 and the truck can be quickly dispatched to its destination. Such data processing as necessary can in part be effectuated by way of a network 104.

In embodiments, a truck 136 load can be mass customized as the truck 136 is on approach to the manufacturer/bottler 106 and immediately loaded upon arrival. This can eliminate the need to pre-manufacture products, stock product, pull shipments together from a vast warehouse of inventory, and then in an inefficient manner load the truck. In operation, this can allow custom formulated products to be prepared based on the trucks destination in a just in time manufacturing method.

In an exemplary embodiment, for example and not a limitation, certain retail stores might want to sell their own brand of custom formulated beverage products. In this case the retail store delivery truck 136 can data communicate its estimated time of arrival status to the manufacturer/bottler 106, the custom formulated beverage products can be produced by way of a multiple stream filling system 200, and the custom formulated beverage products can be loaded onto the retail store delivery truck upon the trucks arrival at the manufacturer/bottler 106.

Figure 1F:
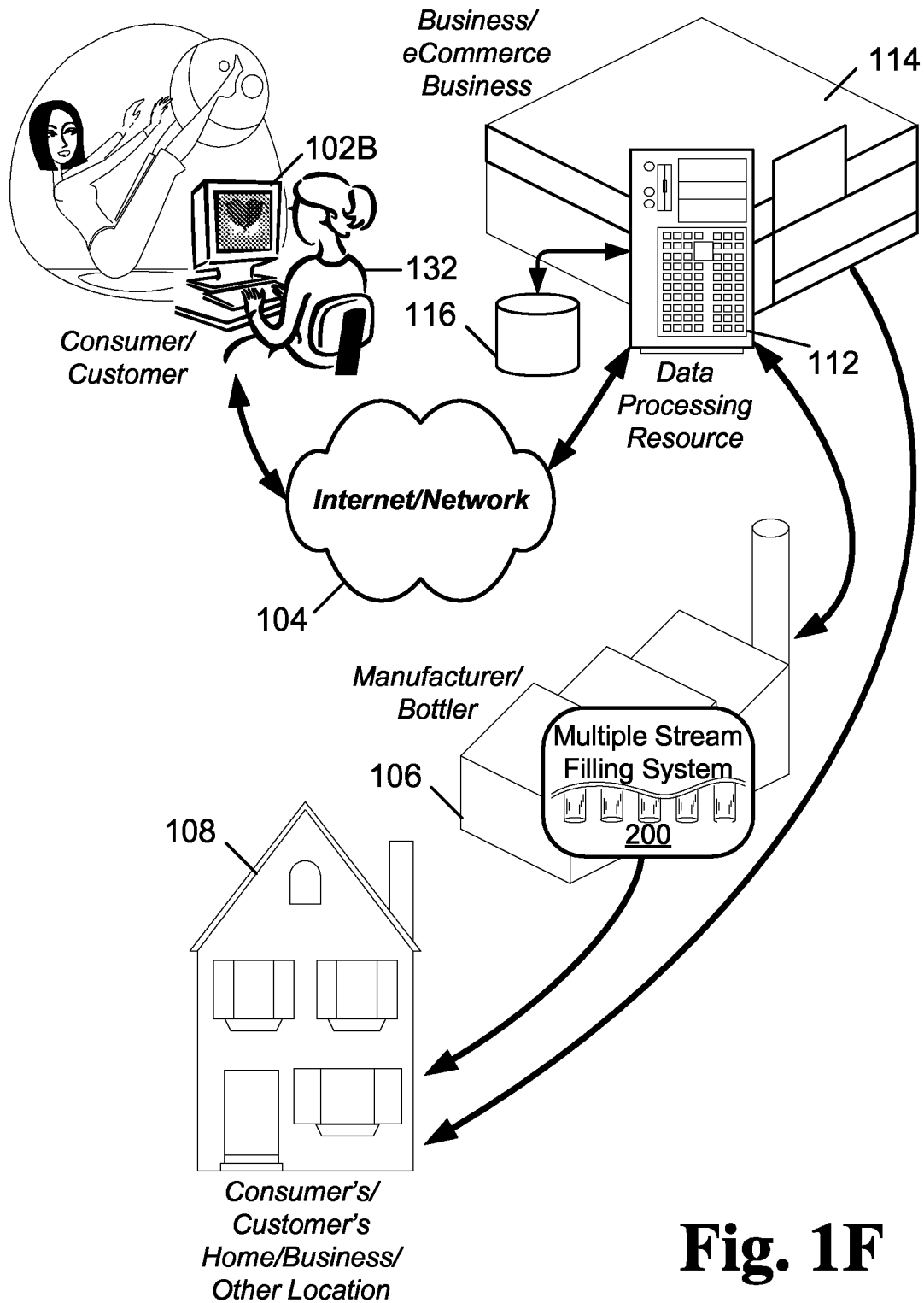
FIG. 1F illustrates one example of a consumer health and/or wellness initiated mass product customization ordering model.

Referring to FIG. 1F there is illustrated one example of a consumer health and/or wellness initiated mass product customization ordering model. In an exemplary embodiment, a consumer/customer 132 can enter data related to medical conditions, exercise conditions, and/or other types and kinds of medical and/or exercise data. The consumer/customer 132 provided data can be data processed and products can be determined that best address the consumer/customer 132 need states with respect to health and wellness conditions. In this regard, for example and not limitation, exercise equipment, health and wellness beverage products, and other types and kinds of products as may be required in a particular embodiment can be determined from the consumer/customer 132 data input. Such data process can be effectuated by way of data processing devices 102, data processing resources 112 and/or database 116. These product orders can be placed with business/ecommerce business 114 wherein subsequent mass customized orders can be received at the manufacturer/bottler 106. A multiple filling line system 200 can manufacture the mass customized order and the products can be shipped from the business/ecommerce business 114 and manufacturer/bottler 106. The product can be delivered to the consumer/customer 132 destination 108 of choice. Such data processing as necessary can in part be effectuated by way of a network 104.

In an exemplary embodiment, for example and not a limitation, a consumer 132 might not know what kind of beverage product would be best for them. In this regard, the consumer 132 can provide personal health and wellness information and the optimum beverage products to maximize the health and wellness benefits the consumer 132 desires can be determined, a multiple filling line system 200 can mass customize the beverage products, and the beverage products can be delivered to a consumer's 132 desired destination 108.

In another exemplary embodiment, for example and not a limitation, a customer 132 may operate a fitness center. In this regard, the customer 132 would like to offer to their consumers a beverage product that is optimized to maximize the health and wellness benefits based on the types and kinds of fitness activities available at the fitness center. The customer 132 can provide information related to the fitness center and the various fitness activities. Information supplied by customer 132 can be data processed and optimum beverage products designed to maximize the health and wellness benefits of the consumer can be determined, a multiple filling line system 200 can mass customize the beverage products, and the beverage products can be delivered to a customer's 132 desired destination 108.

Figure 1G:
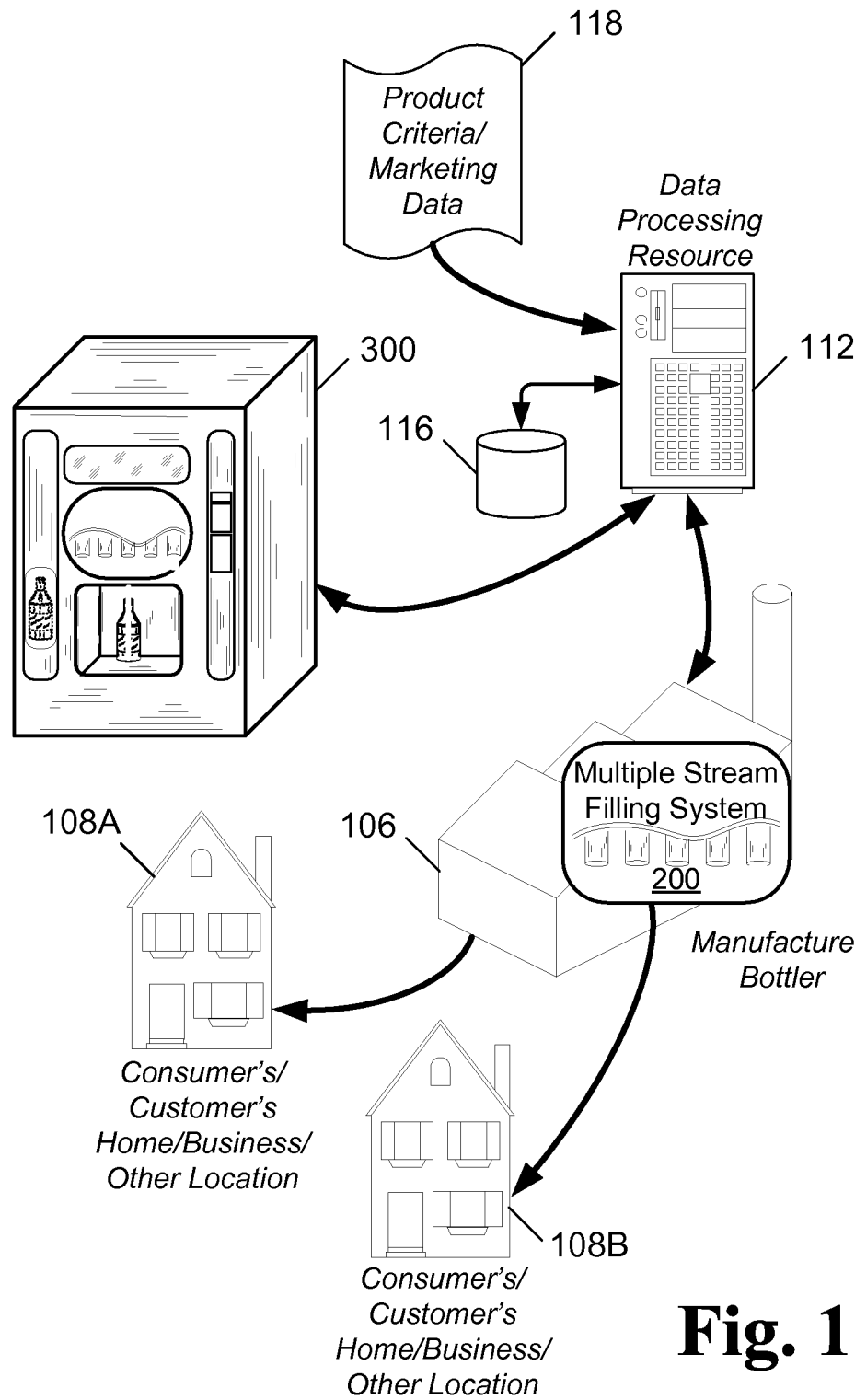
FIG. 1G illustrates one example of a new product launch using mass product customization manufacturing.

Referring to FIG. 1G there is illustrated one example of a new product launch using mass product customization manufacturing. In an exemplary embodiment, for example and not a limitation, consumers/customers 132 can be identified to receive product based on product criteria and/or marketing data 118. In this regard, product criteria and/or marketing data 118 can be utilized to query a consumer/customer 132 list by way of a data processing resource 112 and/or database 116. The consumer/customer 132 list can then be data communicated to the manufacturer/bottler 106, wherein a multiple stream filling system 200 can be utilized to mass customize orders for each of the consumers/customers 132 on the list. The completed orders can then be delivered to consumers/customers 132 destinations 108A-B.

Alternatively, in an exemplary embodiment, for example and not a limitation, a consumer 132 can be identified as being part of the consumers/customers 132 list generated by the product criteria and/or marketing data 118 while at a vending machine 300. As such, the new product can be dispensed from the vending machine 300 to the consumer 132.

Figure 1H:
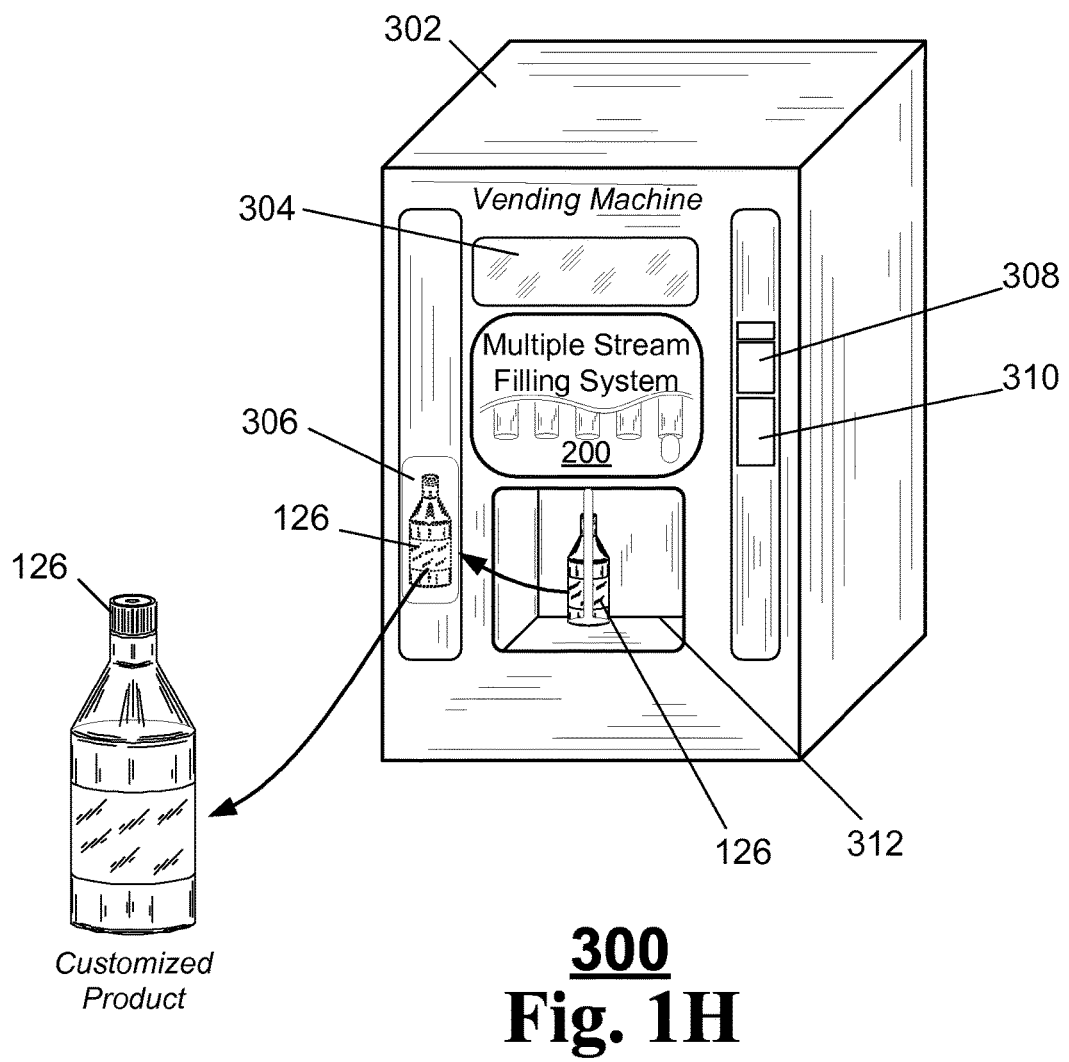
FIG. 1H illustrates one example of a consumer initiated mass product customization vending machine.

Referring to FIG. 1H there is illustrated one example of a consumer initiated mass product customization vending machine. In an exemplary embodiment, a multiple stream filling system can be incorporated into a vending machine 300. In this regard, a consumer 132 can interact with the vending machine 300 in an unattended manner to determine, order, and have dispensed customized products. Illustrated in FIG. 1H is a multiple stream filling system 200 incorporated into a vending machine body 302. Also shown is a consumer/customer 132 interface 304, a fill zone 312, a dispense area 306, and a payment center 308 and 310, wherein a consumer can pay by loyalty, cashless, bills, coins, and/or other payment methods for mass customized products.

In embodiments, a vending machine 300 can be located at events, activities, and other locations. In addition, vending machine 300 can be operated in an unattended mode, responsive to orders placed by consumers/customers 132 or data processing resource 112. Furthermore, consumers/customers 132 can use interface 304 to place orders and payment center 308 and 310 to pay for customized products. In an exemplary embodiment, for example and not a limitation, vending machine 300 can be configured to customize food, beverage, cosmetics, and/or other types and kinds of products as may be required and or desired in a particular embodiment.

Figure 1I:
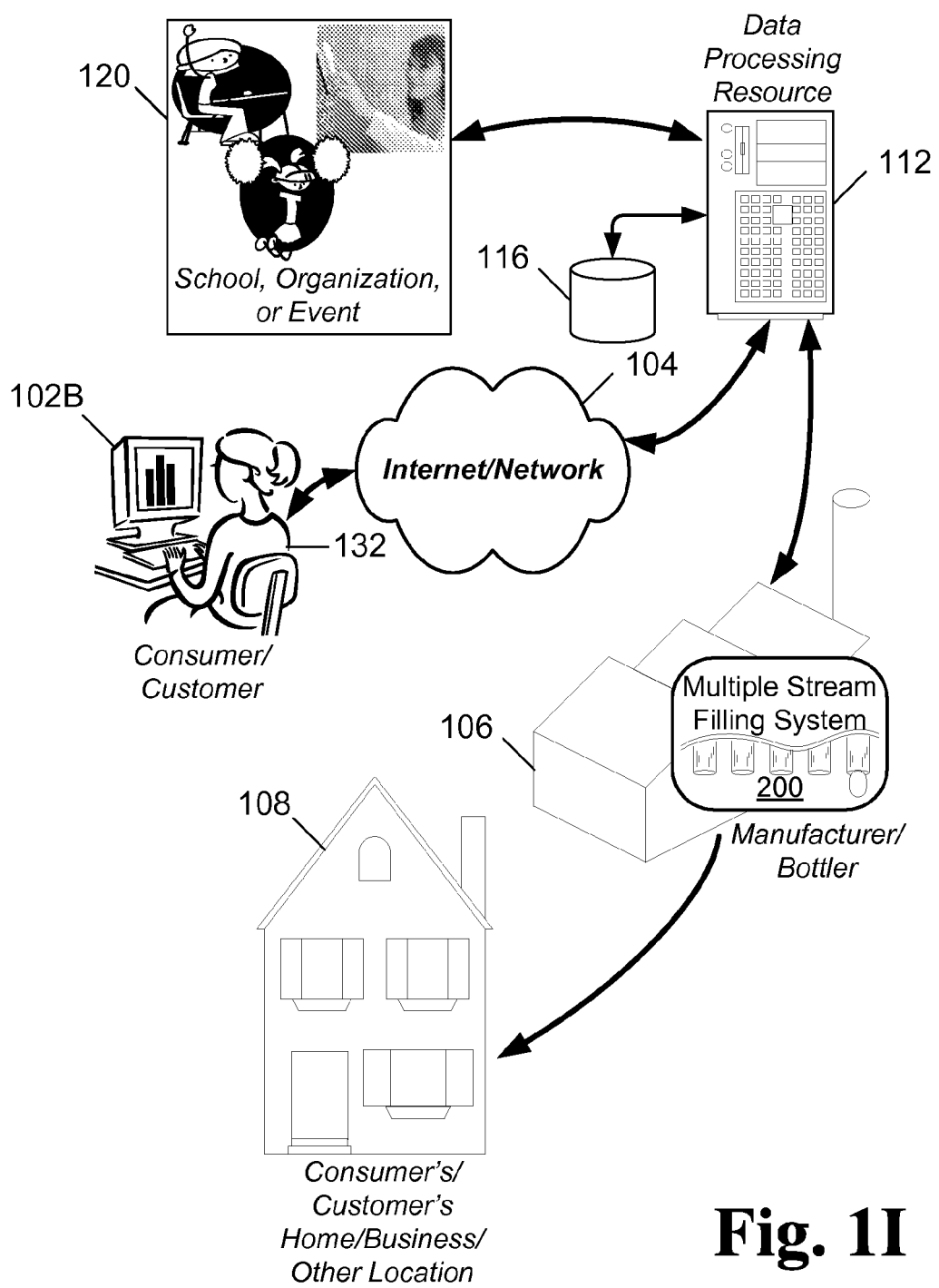
FIG. 1I illustrates one example of an organization initiated fundraiser wherein the organization determines the mass customizable products and a number of consumer initiated mass product customization orders.

Referring to FIG. 1I there is illustrated one example of an organization initiated fundraiser wherein the organization determines the mass customizable products and a number of consumer initiate mass product customization orders. In an exemplary embodiment, for example and not a limitation, an organization 120 such as a school, team, event and/or other types and kinds of organizations can determine their own mass customizable products. In this regard, once the organization 120 determines their mass customizable products then consumers/customers 132 can place orders for the products. A data processing resource 112 and/or a database 116 can receive the organizations 120 mass customized product determinations and consumer/customer 132 orders.

In an exemplary embodiment, consumers/customers 132 can be local consumers and customer businesses and can be contacted by way of a marketing effort implemented by the organization 120. The data processing resource 112 can place orders with the manufacturer/bottler 106, wherein a multiple stream filling system 200 can produce the mass customized product determined by the organization 120. The product can then be delivered to the consumer/customer 132 destination 108 of choice. Portions of the proceeds can benefit the organization 120 as a fundraiser or other revenue producing activity. Such data processing as necessary can in part be effectuated by way of a network 104.

Figure 1J:
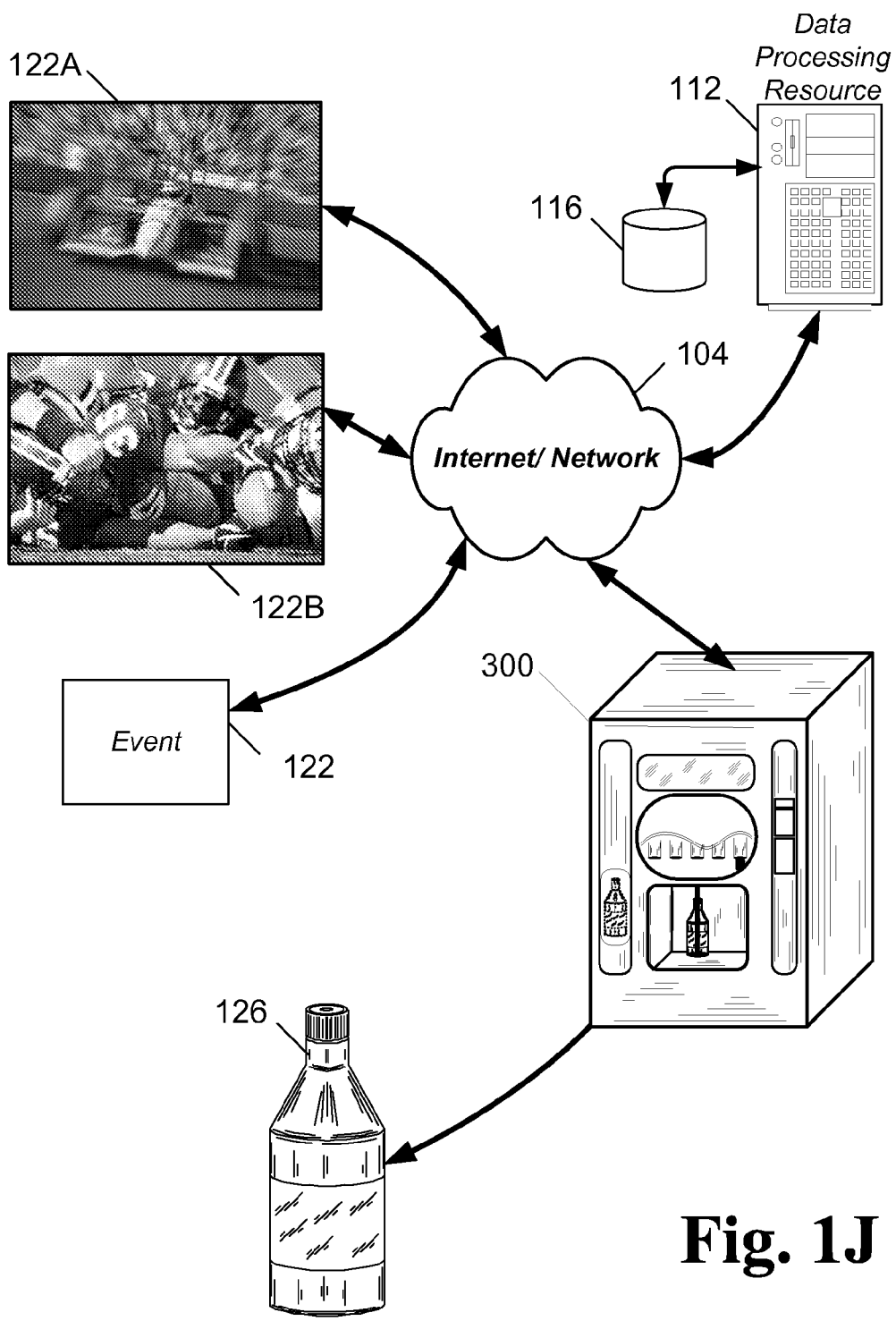
FIG. 1J illustrates one example of utilizing event outcome during mass product customization.

Referring to FIG. 1J there is illustrated one example of utilizing event outcome during mass product customization. In an exemplary embodiment, for example and not a limitation, outcomes from events such as sporting events, news events, and/or other events can be utilized during the mass customization process. In this regard, the current or final outcome of the event such as a race 122A, a football game 122B, and/or other types and kinds of events can be utilized during the mass customization process.

In an exemplary embodiment, data regarding an event 122 can be data communicated to a data processing resource 112 and/or database 116 by way of a network 104. A consumer/customer 132 utilizing vending machine 300 having the capability of mass customizing products can formulate the consumer/customer 132 product 126 of choice and during the product 126 manufacturing, customize the label with information related to the event 122.

As an example and not a limitation, if a certain team is leading at halftime during a championship football game, such data can be communicated to data processing resource 112. When a consumer then requests a customized beverage from vending machine 300, the label can be printed indicating that the certain team was leading at halftime. Later at the conclusion of the game, where the opposing team has won the football game, consumers obtaining product 126 from the vending machine 300 will be treated to commemorative product packaging depicting the outcome of the football game.

In another exemplary embodiment, consumers 132 can order customized products associated with a selected star or celebrity. Such favorite star or celebrity can be a sports figure, movie, and/or other types and kinds of favorite star or celebrity. The product 126 can then be manufactured and the product 126 packaging can be customized with information associated with the favorite star or celebrity.

As an example and not a limitation, at vending machine 300 a consumer 132 could select a cola beverage with vanilla flavoring and vitamins, and at the same time the consumer 132 could indicate that a certain basketball player is his favorite star or celebrity. The vending machine by way of a multiple stream filling system 200 that can manufacture the beverage to the consumer's specifications and include on the product packaging information related to the basketball player.

In a number of events 122, commemorative products packaging depicting the event (during the event and/or final outcome) can be including at the time the product is being manufactured by a vending machine 300. In addition, such commemorative product 126 packaging depicting the event can optionally be ordered later by way of a manufacturer/bottler 106 and delivered to a destination 108 of the consumer/customer 132 choice. For purposes of disclosure event 122A, or event 122B can be referred to as event 122. In addition, organizational events, school activities, sporting events, and other types and kinds of activities can be referred to as events 122.

Figure 1K:
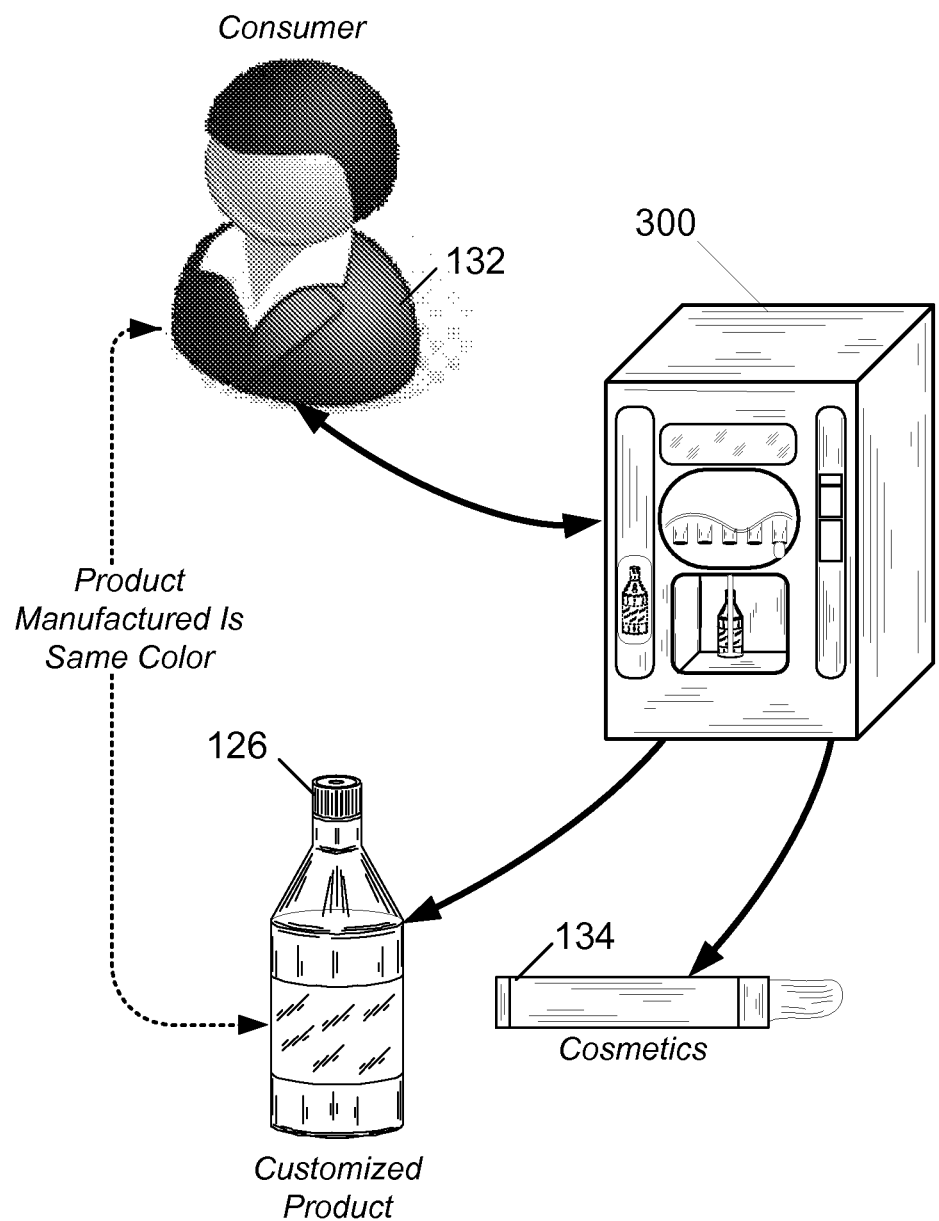
FIG. 1K illustrates one example of controlling product color during consumer initiated mass product customization.

Referring to FIG. 1K there is illustrated one example of controlling product 126 color during consumer initiated mass product customization. In an exemplary embodiment, a consumer 132 may desire to have a product that matches the color of an article of clothing. In this regard, the consumer 132 can utilize a mass customizable vending machine 300 to first identify the color of the article of clothing to match and then alter the color of the beverage product 126 and/or a cosmetic product 134 to the article of clothing. Such identification of the color of an article of clothing can be done by optical detection and/or selection by way of a consumer interface.

In an exemplary embodiment, for example and not a limitation, a consumer 132 can have the vending machine determine the color of a sweater or other article of clothing consumer 132 is wearing. Once determined, the vending machine 300 can customize lipstick or a beverage that matches in color the article of clothing.

Figure 2A:
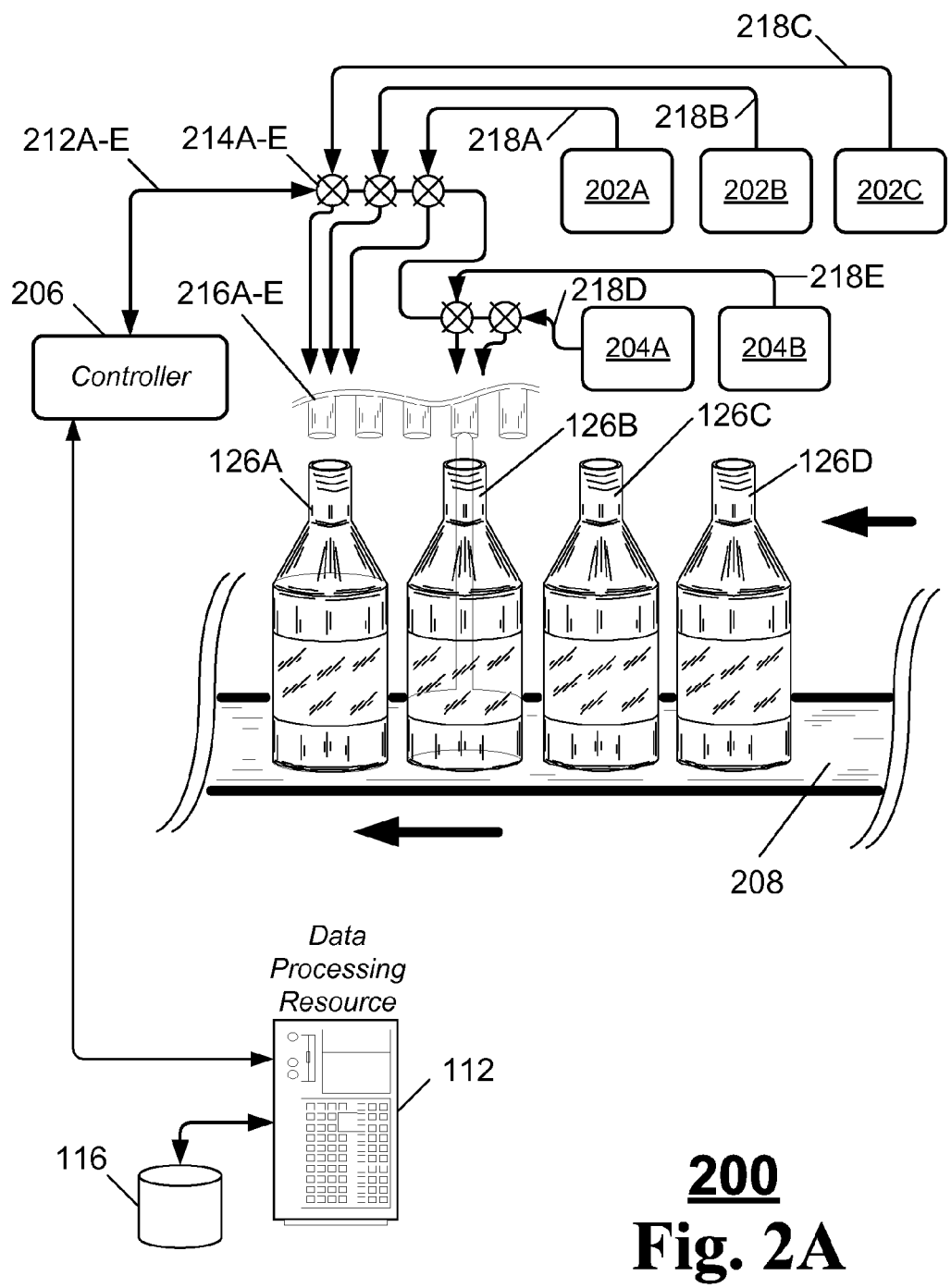
FIG. 2A illustrates one example of a multiple stream filling system.

Referring to FIG. 2A there is illustrated one example of a multiple stream filing system. Embodiments of a multiple stream filing system are disclosed in U.S. Ser. No. 11/686,387, which is incorporated by reference above. In an exemplary embodiment, a multiple stream filling system 200 can have a number of product packaging 126A-D moving down a conveyer 208. In some instances, the conveyor 208 may operate in a continuous fashion without the need to pause about each nozzle 216A-E. The controller 206 can be in data communication with a data processing resource 112 and/or database 116 to receive orders and/or other types and kinds of data as may be required and or desired in a particular embodiment. The controller 206 can be in data communication with a number of pumps/valves 214A-E by way of interconnections 212A-E. Responsive to controller 206 each of the pumps/valves 214A-E are individually controllable allowing a precise amount of micro-ingredient from any of the number of micro-ingredients 202A-C or any of the number of macro-ingredients 204A-B to be dispensed through nozzle manifold 216A-E.

For purposes of disclosure packaging 126A-D can be referred to as packaging 126. A number of micro-ingredients 202A-C can be referred to as micro-ingredients 202. A number of macro-ingredients 204A-B can be referred to as macro-ingredients 204. Nozzle manifold 216A-E includes a number of nozzles wherein each nozzle 216 is interconnected with a pump/valve 214 and at least one micro-ingredient 202 or macro-ingredient 204. Each pump/valve 214A-E is interconnected with a micro-ingredient 202A-C, or macro-ingredient 204A-C by way of tubing 218A-E. The pumps/valves 214A-E each pump the micro-ingredients 202, and macro-ingredients 204 through a multiple stream manifold 216A-E also referred to as nozzles 216A-E or nozzle 216.

It is important to note that the micro-ingredients 202 and macro ingredients 204 meet and mix in the package 126. In this regard, the ingredients do not contaminate each other on the manufacturing line and as such do not require cleaning or change over between the manufacture of different types and kinds of products. In other words, the system can produce a number of beverage products sequentially without performing an operation between products to reduce contamination of the beverage product with ingredients from a previously produced beverage product. This is true even if the beverage products have differing characteristics, such as differing contents, ingredients, additives or formulation.

As example, micro-ingredient 202A is drawn through tubing 218A by way of pump/valve 214A. The micro-ingredient 202A is then dispensed through nozzle 216A into product packaging 126 as the packaging 126 passes in proximity to the nozzle 216A as needed, in precise proportions, as dictated by a recipe managed by controller 206. In the manufacture of a product, a number of nozzles 216 may be required to formulate a single package 126. In this regard, flavoring from one nozzle might be dispensed first, then syrup, then carbonated water each from a different nozzle 216 to formulate correctly the desired beverage product. The recipe can be determined by a consumer/customer 132 or be resident in a database of standard formulations.

In an exemplary embodiment, for example and not a limitation, a micro-ingredient 202 can be a coloring, flavoring, nutraceutical, vitamin, health and wellness product, and/or other types of micro-ingredients 204 as may be required and or desired in an embodiment. A macro-ingredient 204 can be water, carbonated water, orange juice, sweetener, a base ingredient, milk, and/or other types and kinds of macro-ingredients 204 as may be required and/or desired in a particular embodiment.

Figure 2B:
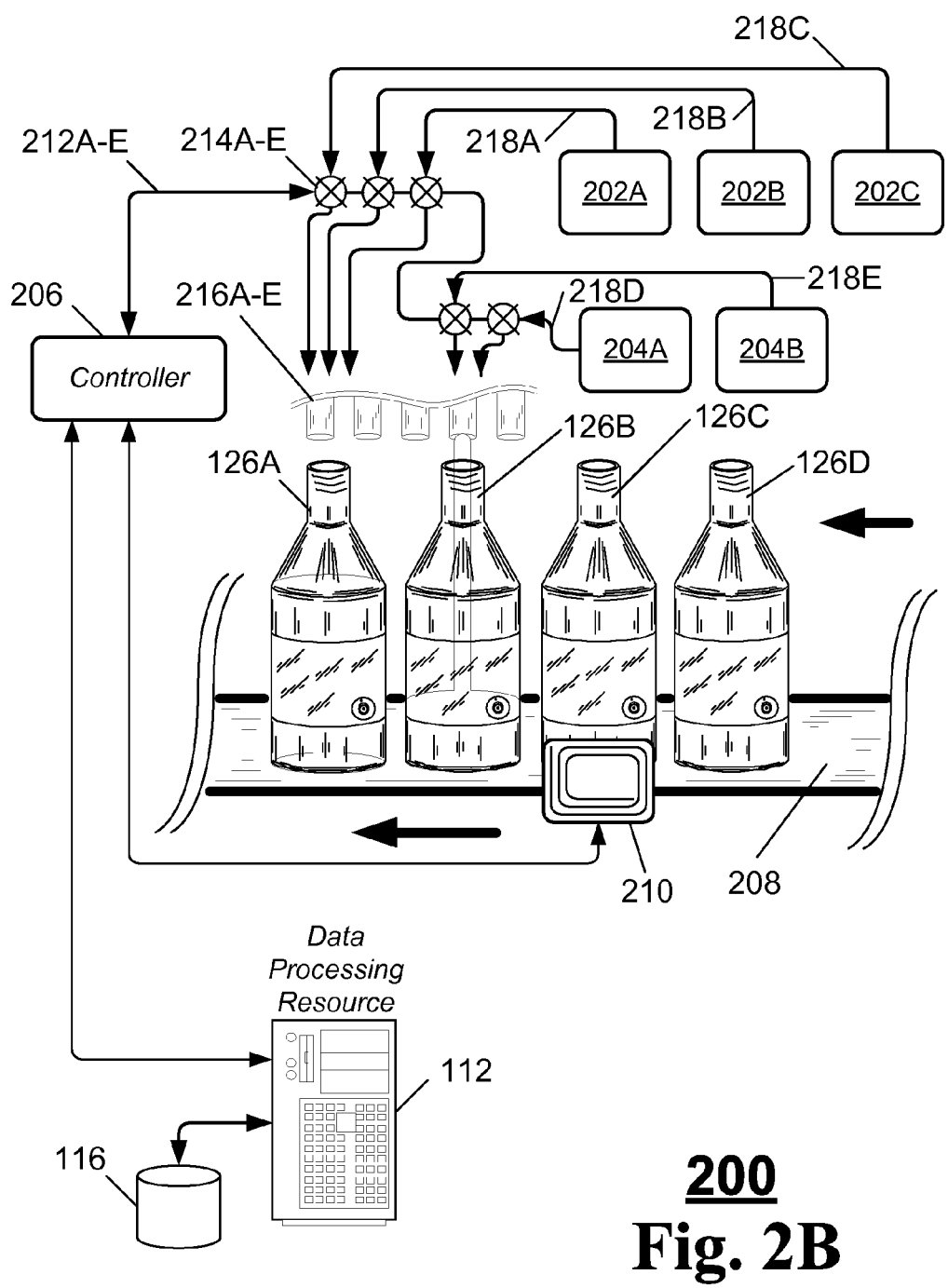
FIG. 2B illustrates one example of using unique product identification to determine formulation of a mass customized product during manufacture.

Referring to FIG. 2B there is illustrated one example of using unique product identification to determine formulation of a mass customized product during manufacture. Unique product identification can include radio frequency identification (RFID), machine readable codes or barcodes, and/or other types and kinds of unique product identification technology and/or indicia as may be required an or desired in a particular embodiment.

In an exemplary embodiment, a multiple stream filling system 200 can have a number of product packaging 126A-D moving down a conveyer 208. Each of the product packaging 126 can be scanned or read by a reader 210. A reader 210 can be a RFID reader, machine readable reader, and/or other types and kinds of readers as may be required and or desired in a particular embodiment. Information from the reader 210 can be data communicated to a controller 206. The controller 206 can be in data communication with a data processing resource 112 and/or database 116 to receive orders and/or other types and kinds of data as may be required and or desired in a particular embodiment. The controller 206 can be in data communication with a number of pumps/valves 214A-E by way of interconnections 212A-E. Responsive to controller 206 each of the pumps/valves 214A-E are individually controllable allowing a precise amount of micro-ingredient from any of the number of micro-ingredient 202A-C or any of the number of macro-ingredients 204A-B to be dispensed through nozzle manifold 216A-E.

In operation, as package 126 moves down the conveyer 208 a reader 210 reads information from the packaging. This information is data communicated to controller 206 wherein a determination is made as to what to dispense into the packaging. Controller 206 operates the appropriate pump/valve 214 such that certain micro-ingredients 202 and macro-ingredients 204 are pumped in precise proportions into the packaging 126 as to mass customize a product. Such products can include beverage products, cosmetic products, health and wellness products, and/or other types and kinds of products as may be required and or desired in a particular embodiment.

Referring to FIG. 2C there is illustrated one example of using consumer/customer 132 supplied text and/or graphic indicia to mass customize product packaging during mass product customization manufacture. In an exemplary embodiment, consumer/customer 132 supplied text and graphic indicia 136 can be added to the product packaging 126 by way of a printer/labeler 220. In this regard, data processing device 112 can supply controller 206 with the appropriate data such that as a consumer's/customer's 132 order is being mass customized text and graphic indicia can be added to the packaging.

In embodiments, organizations, custom ingredient formulation information, fundraiser, shipping, event, activity, and/or other types and kinds of information can be customized and added to the product packaging effectuating the ability of the multiple stream filling system 200 to both customize the product and the product packaging.

Referring to FIG. 3 there is illustrated one example of a method of customizing a branded beverage for different consumer/customer need states. In an exemplary embodiment, a consumer or customer 132 can place an order for mass customizable products via a network 104 by way of computing device 102A, personal computer (PC) 102B, data processing device 102C, and/or by way of other types and kinds of devices and methods as may be required and or desired in a particular embodiment. In this regard, consumer/customer 132 can select products that combine micro-dosed ingredients 202 with macro-dosed ingredients 204 to form the mass customizable product. The consumer/customer 132 order is then used to configure at a manufacturer/bottler 106 a multiple stream filling system 200 such that the consumer/customer 132 order is produced on the filling line. The completed order can then be delivered to the consumer/customer 132 or other desired location 108.

For purposes of disclosure, a consumer can be defined as the buyer of the product and a customer can be defined as retail partners that are responsible for the sale of the product. A retail store is an example of a customer. As such, for purposes of disclosure a consumer/customer 132 can be either a consumer or a customer. A consumer/customer 132 can also be referred to as a consumer 132 or a customer 132.

In addition, for purposes of disclosure a computing device 102A, a personal computer 102B, and a data processing device 102C can be referred to as a data processing device 102. In addition, a data processing device 102C can be a personal data assistant, a wireless phone, a pocket PC, and/or other types and kinds of data processing devices.

In embodiments, orders can be accepted, used to configure a multiple stream filling system 200, product can be mass customized manufactured to consumer/customer 132 specifications, and the products delivered to a destination 108 of choice.

In an exemplary embodiment, for example and not a limitation, a consumer 132 that likes a particular brand of diet cola can order different variations of the product tailored for different times in the day. For example, the consumer 132 may desire a diet cola with vitamins and certain nutraceuticals in the morning, a diet cola with energy supplement in the afternoon, and a diet cola with no caffeine in the evening. In this regard, the consumer 132 can place an order that is received at a multiple stream filling system 200 wherein the consumer's 132 mass customized order is processed, producing a week, month, or other time period supply of the different variations of the product that is then delivered to the consumer 132.

In another exemplary embodiment, for example and not a limitation, a consumer may have a favorite team or maybe hosting a sports party such as a football championship game party and desire to have color coordinated beverage products matching the team colors. In this regard, the consumer 132 can order cases of the mass customized beverage products for example selecting the final color of the beverage products. The order can be received at a multiple stream filling system 200 where the mass customized beverage products are produced and subsequently delivered to the consumer 132. For purposes of disclosure, products can be referred to as beverages and beverage products.

In another exemplary embodiment, a customer 132 may desire to stock a mass customized beverage in his or her retail store. In this regard, perhaps the storeowner has a specific formulation that is associated with the store. The customer can place a mass customized order for cases of the specially formulated beverage product. The order is received at a multiple stream filling system 200 where it is produced and subsequently delivered to the customer 132, wherein the beverage product can be sold in the owner's retail store.

If the product is not available in stores as a standard stocked item, and/or is needed for a special event the consumer/customer 132 can order it, have it manufactured to consumer/customer 132 specifications and subsequently have the product delivered or otherwise picked up. The method begins in block 1002.

In block 1002 consumer/customer 132 selects a product. Such product selection can be via data processing device, online, at a vending machine 300 and/or by way of other types and kinds of selection methods as may be required and desired in a particular embodiment. Processing then moves to block 1004. In block 1004 the consumer/customer 132 customizes the product to address specific need states of the consumer/customer 132. For disclosure purposes needs state can be defined as different things consumer/customers 132 need at different times. An example may be the need for a sports drink after working out, or an afternoon energy boost late in the day. Processing then moves to block 1006. In block 1006 the consumer/customer 132 order is received at product manufacturer/bottler 106 production lines wherein a multiple stream filling system is configured to manufacture the order. Processing then moves to block 1008. In block 1008 products are produced with a formulation in accordance with the consumer need states. Processing then move to block 1010. In block 1010 products are labeled with indicia. The label indicia include consumer/customer 132 determined customized product formulation and/or other indicia. Processing then moves to block 1012. In block 1012 the products are delivered to the consumer/customer 132 destination 108 of choice. The routine is then exited.

Referring to FIG. 4 there is illustrated one example of a method of allowing a consumer to select the type and/or kind of packaging material to use during mass product customization manufacture. In an exemplary embodiment, for example and not a limitation, a consumer/customer 132 can in addition to determining the product mass customization formulation can also determine the type and/or kind of packaging utilized. For example if the consumer/customer 132 desired to have the product packaged in one liter packages the consumer/customer 132 could in addition to determining the product formulation itself also determine the type and/or kind of packaging to manufacture the product into. Then method begins in block 2002.

In block 2002 the consumer/customer 132 determines the packaging enclosure type. Processing then moves to block 2004. In block 2004 the product manufacturing line if configured to use the consumer/customer 132 selected packaging. Processing then moves to block 2006. In block 2006 the consumer/customer 132 product is mass customized by way of a multiple stream filling system 200 in accordance with consumer/customer 132 specifications and packaged in the select package. The routine is then exited.

Referring to FIG. 5 there is illustrated one example of a method of preparing a mass customized order upon the detection of a truck approaching a manufacturing facility. In an exemplary embodiment, a just in time mass product customization manufacturing model can be effectuated when a delivery truck 136 is on approach to the manufacturer/bottler 106 by data communicating over a network 104, an estimated time of arrival, truck 136 data, and/or other types and kinds of data as may be required and or desired in a particular embodiment. This data can be received, data processed, used to obtain other data, and or otherwise utilized by the manufacturer/bottler 106 to prepare a mass customized order. In this regard, a multiple stream filling system 200 can be configured and a mass customized order tailored for the approaching truck 136. Upon the truck 136 arrival to the manufacturer/bottler 106 the just in time manufactured mass customized order can be loaded onto the truck 136 and the truck dispatched to it destination.

In embodiments, a truck 136 load can be mass customized as the truck 136 is on approach to the manufacturer/bottler 106 and loaded upon arrival. This can eliminate the need to pre-manufacture products, stock product, pull shipments together from a vast warehouse of inventory, and then in an inefficient manner try to load the truck. In operation, this can allow custom formulated product to be prepared in a just in time manufacturing method.

In an exemplary embodiment, for example and not a limitation, certain retail stores might want to sell their own brand of custom formulated beverage products. In this case the retail store delivery truck 136 can data communicate its nearing arrival status to the manufacturer/bottler 106, the custom formulated beverage product can be produced by way of a multiple stream filling system 200, and the custom formulated beverage product loaded onto the retail store delivery truck upon the trucks arrival at the manufacturer/bottler 106. The method begins in block 3002.

In block 3002 a truck 136 is identified on approach to the manufacturer/bottler 106 and/or loading dock. As such, the truck can data communicate with manufacturer/bottler 106, a data processing resource 112, and/or data communicate in other ways and with other devices as may be required and or desired in a particular embodiment.

In an exemplary embodiment, for example and not a limitation, identification and/or data communication can include placing a mass customized order, communicating formulation information, communicating delivery destination, communication truck information, communicating information that can be used to obtain other data. Such other data can be from a data processing resource 112 and/or other types and kinds of data processing devices. Processing then moves to block 3004. In block 3004 the manufacturing line is configured to produce the order for the identified truck 136. Such configuration can include configuring a multiple stream filling system 200 and manufacturing products to fulfill a mass customized order. Processing then moves to block 3006. In block 3006 products are produced and prepared for loading onto the truck 136. Processing then moves to block 3008. In block 3008 as appropriate, indicia is placed on the customized product packaging. Such indicia can be included on the label that is associated with the product packaging. In an exemplary embodiment, for example and not a limitation, such indicia can be a consumer/customer 132 supplied text and/or graphic indicia. In addition, such indicia can be customized based on the delivery destination 108 of the truck. Processing then moves to block 3010. In block 3010 the mass customized order is loaded onto the truck 136. The truck 136 can then be dispatched to a delivery destination 108 of choice. The routine is then exited.

Referring to FIG. 6 there is illustrated one example of a method of using the consumer/customer 132 supplied text and/or graphic indicia during the preparation of a mass customized order. In an exemplary embodiment, a consumer/customer 132 can supply text and/or graphic indicia that can be used during the manufacture of the mass customized product. Such indicia can be graphics that get printed onto the product labels, product packaging, and/or used in other ways as may be required and or desired in a particular embodiment. The method begins in block 4002.

In block 4002 the consumer/customer 132 provides text and/or graphic indicia. The consumer/customer 132 can supply such indicia by way of online, supply a physical copy of the text and/or graphic, and/or by other methods as may be required and/or desired in a particular embodiment. Processing then moves to block 4004. In block 4004 the manufacturing line is configured to use the consumer/customer 132 supplied indicia. Processing then moves to block 4006. In block 4006 the product is manufactured and mass customized. The consumer/customer 132 provided indicia is utilized on the product label, packaging, and/or in other ways as may be required and/or desired in a particular embodiment. The routine is then exited.

Referring to FIG. 7 there is illustrated one example of a method of a consumer/customer 132 placing a mass customizable order online with order pickup, shipping, or delivery options. In an exemplary embodiment, consumers/customers 132 can place orders for mass customizable products. The orders are received by a manufacturer/bottler 106, wherein a multiple stream filling system 200 and/or other types and kinds of equipment can be configured. The consumer/customer 132 mass customizable product can be manufactured and delivered to a destination 108 of choice. Such destination 108 of choice can be a home, office, store, picked up by consumer/customer 132, and/or other types and kinds of destinations 108 as may be required and or desired in a particular embodiment. The method begins in block 5002.

In block 5002 the consumer/customer 132 selects and orders a product online to be manufactured to the consumer's/customer's 132 specifications. Processing then moves to block 5004. In block 5004 the consumer/customer 132 order is received and the manufacturing line is configured. Such configuration can include configuring a multiple stream filling system 200. Processing then moves to block 5006. In block 5006 the consumer/customer 132 order is manufactured or otherwise produced. Processing then moves to block 5008. In block 5008 the consumer/customer 132 picks up the order at a destination of choice. Alternatively, the order can be shipped or delivered to a destination 108 of choice. The routine is then exited.

Figures 8, 9:
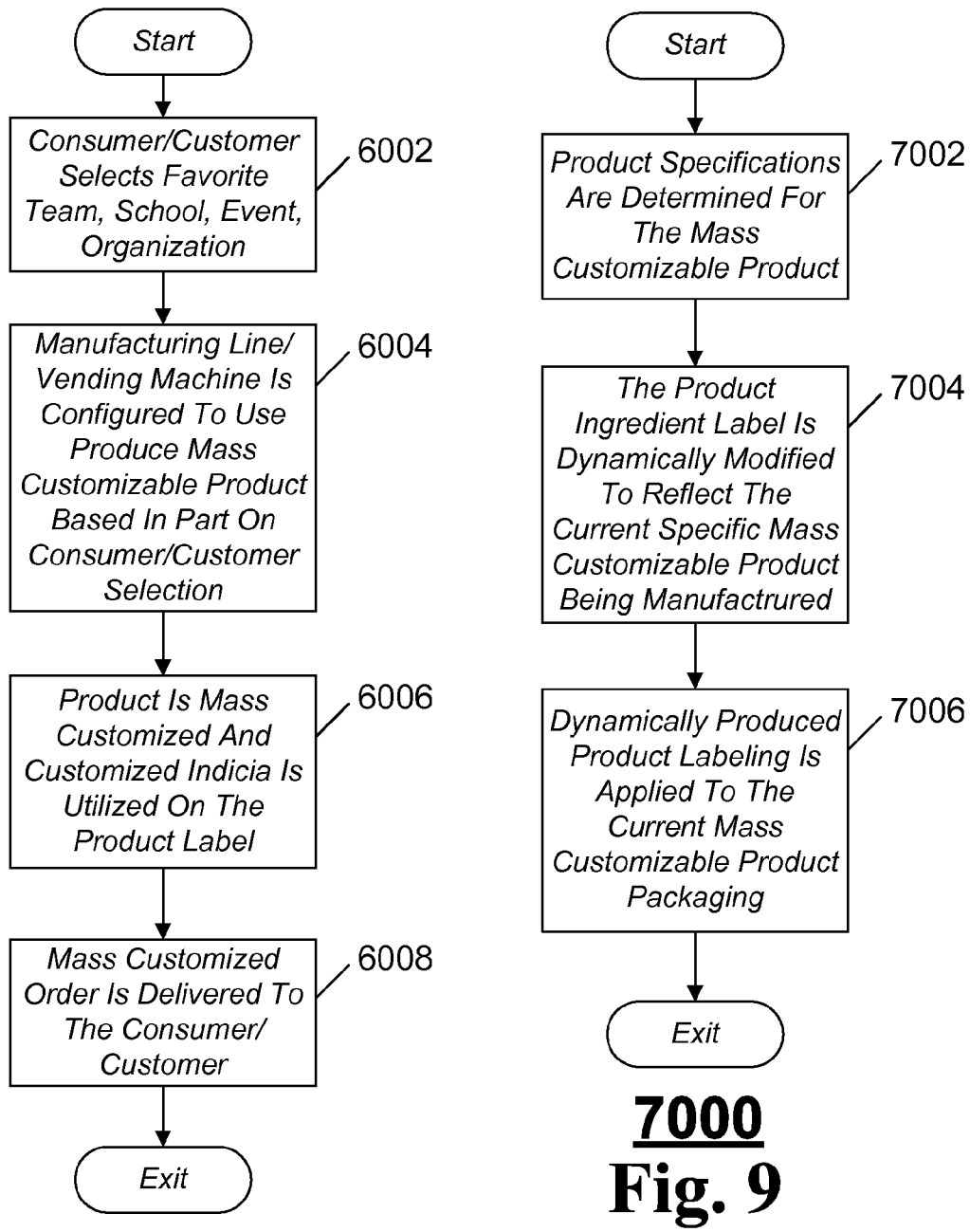
FIG. 8 illustrates one example of a method of a consumer placing a mass customizable order related to a team, school, organization, and/or other event, wherein the order is produced, and delivered to the consumer.
FIG. 9 illustrates one example of a method of dynamically rendering and applying a unique label to a mass customized product at the time of manufacture.

Referring to FIG. 8 there is illustrated one example of a method of a consumer/customer 132 placing a mass customizable order related to a team, school, organization, and/or other event, wherein the order is produced, and delivered to the consumer/customer 132. In an exemplary embodiment, for example and not a limitation, outcomes from events such as sporting events can be utilized during the mass customization process. In this regard, the current or final outcome of the event such as a race 122A, a football game 122B, and/or other types and kinds of events can be utilized during the mass customization process.

In an exemplary embodiment, data regarding an event such as event 122 can be data communicated to a data processing resource 112 and/or database 116 by way of a network 104. A consumer/customer 132 utilizing vending machine 300 having the capability of mass customizing products can formulate the consumer/customer 132 product 126 of choice and during the product manufacturing customize the label with information related to the event 122.

In a number of events 122 commemorative products packaging depicting the event (during the event and/or final outcome) can be including at the time the product is being manufactured by a vending machine 300. In addition, such commemorative product 126 packaging depicting the event can optionally be ordered later by way of a manufacturer/bottler 106 and delivered to a destination 108 of the consumer/customer 132 choice. The method begins in block 6002.

In block 6002 the consumer/customer 132 selects a favorite team, school, event, and/or organization. Processing then moves to block 6004. In block 6004 the manufacturer/bottler 106 receives the order or alternatively the consumer 132 utilizes a vending machine 300. In this regard, the mass customizable product is manufactured based in part on the consumer/customer 132 selection. Processing then moves to block 6006. In block 6006 the product is mass customized manufactured and customized indicia related to the team, school, organization, and/or other event can be applied to the product label, and/or packaging. Processing then moves to block 6008. In block 6008 the mass customized order is delivered or dispensed to the consumer/customer 132. The routine is then exited.

Referring to FIG. 9 there is illustrated one example of a method of dynamically rendering and applying a unique label to a mass customized product at the time of manufacture. In an exemplary embodiment, as consumers/customers 132 create custom formulations the need arises to dynamically customize the label and product packaging such that the indicia on the mass customizable product is accurate with respect to what is in the product packaging. In addition, as custom text and graphic indicia are desired and/or required to be added to certain of the mass customized product packaging the need arises to be able to dynamically render and apply a unique label to a mass customized product at the time of manufacture.

In an exemplary embodiment, a consumer submits a short message, along with their name and city, to a beverage manufacturer. This message could be submitted through a website, by filling out a postcard at a customer location, or by entering the information into a computer kiosk in a public location. The message would then go into a database, be screened for inappropriate language, and sent to the printer/labeler 220 by way of controller 206. The messages in the database would be printed on the mass customized product packaging coming down the assembly line. The messages could be ones that were gathered locally, or ones gathered from across the around the world. One message could be printed on several products, or on a single product. The products would then be filled and distributed as normally done.

A promotional advantage, around this concept could encourage someone who has read a bottle to go to the website of the beverage manufacturer and respond back to the person whose message they received, allowing the beverage manufacturer the opportunity to foster connections between consumers.

In another exemplary embodiment, for example and not a limitation, when the internet 104 is used to respond to messages, consumers will be able to see where their message was printed and what others thought of the message. In this regard, responses to the messages can be posted to an internet web-site.

The ability to gather and to disseminate numerous, random messages from other consumers is a new brand building tool. The message gathering and print methods permit the thoughts of consumers to be incorporated onto packaging virtually instantly, which promotes timeliness. The method begins in block 7002.

In block 7002 the product specifications are determined for the mass customizable product. Such product specifications can include custom text and or graphic indicia. Processing then moves to block 7004. In block 7004 the product ingredient label is dynamically modified to reflect the current specific mass customizable product being manufactured. Processing then moves to block 7006. In block 7006 the dynamically produced product labeling is applied to the current mass customizable product packaging. The routine is then exited.

Referring to FIG. 10 there is illustrated one example of a method of obtaining symptoms, illness, health, wellness, and/or other medical information from a consumer/customer 132 and then formulating and mass customizing products for the consumer/customer 132 based in part on the obtained consumer information. In an exemplary embodiment a consumer/customer 132 can enter at a website medical conditions, exercise conditions, and/or other types and kinds of medical and/or exercise data. The consumer/customer 132 provided data can be data processed and products can be determined that best address the consumer/customer 132 need states, with respect to health and wellness conditions. In this regard, for example and not limitation, exercise equipment, health and wellness beverage products, and other types and kinds of products, as may be required in a particular embodiment, can be determined from the consumer/customer 132 data input. For purposes of disclosure symptoms, illness, health, wellness, and/or other medical information can be referred to as health and wellness information or health and wellness data.

In an exemplary embodiment, for example and not a limitation, a consumer 132 might not know what kind of beverage product would be best for them. In this regard, the consumer 132 can provide personal health and wellness information and the optimum beverage products to maximize the health and wellness benefits the consumer 132 desires can be determined, a multiple filling line system 200 can mass customize the beverage products, and the beverage products can be delivered to a consumer's 132 desired destination 108.

In another exemplary embodiment, for example and not a limitation, a customer 132 may operate a fitness center. In this regard, the customer 132 would like to offer to their consumers a beverage product that is optimized to maximize the health and wellness benefits based on the types and kinds of fitness activities available at the fitness center. The customer 132 can provide information related to the fitness center and the various fitness activities. Information supplied by customer 132 can be data processed and optimum beverage products designed to maximize the health and wellness benefits of the consumer can be determined, a multiple filling line system 200 can mass customize the beverage products, and the beverage products can be delivered to a customer's 132 desired destination 108. The method begins in block 8002.

In block 8002 a consumer/customer 132 can use online tools, forms, or other data input interface to provide data related to symptoms, illness, health, wellness, and/or other medical information. Processing then moves to block 8004. In block 8004 a manufacturing line or alternatively a vending machine 300 can be configured to produce the mass customizable product based in part on consumer input. Processing then moves to block 8006. In block 8006 the product is mass customized and customized indicia as appropriate is utilized on the product label. Processing then moves to block 8008. In block 8008 the mass customized order is delivered or otherwise dispensed to the consumer. The routine is then exited.

Referring to FIG. 11 there is illustrated one example of a method of allowing a consumer to select a product and then mass customizing a number of line extensions and/or derivative products based in part on the consumer selected product. In an exemplary embodiment, for example and not a limitation, a consumer/customer 132 can order a product such as cola beverage and specify that they would like all the line extensions or derivative products as part of their order. The order can be received at a vending machine 300 or at a manufacturer/bottler 106 wherein a multiple stream filling system 200 can produce the selected product and the line extensions and/or derivative products. In this regard, a cola beverage can be manufactured and dispensed from the vending machine 300 or delivered to the consumer/customer 132, along with line extensions and/or derivatives such as a lime cola beverage, a cherry cola beverage, a vanilla cola beverage, and a diet cola beverage.

A consumer/customer 132 can be introduced to new products by ordering a single product type that they may be familiar with and then specifying they want line extensions or derivatives of the selected product as part of their order. In this regard, consumers/customers 132 are exposed to and can try a large spectrum of products that are related to a product they selected. The method begins on block 9002.

In block 9002 the consumer/customer 132 selects a product. Processing then moves to block 9004. In block 9004 the manufacturing line or vending machine 300 is configured to produce the mass customizable product as well as line extensions and/or derivative product related to the consumer's/customer's 132 selection. Processing then moves to block 9006. In block 9006 the products are mass customized and customized indicia as appropriate is utilized on the products packaging. Processing then moves to block 9008. In block 9008 the mass customized order is delivered to a destination 108 and/or dispensed to the consumer/customer 132. The routine is then exited.

Figure 12:
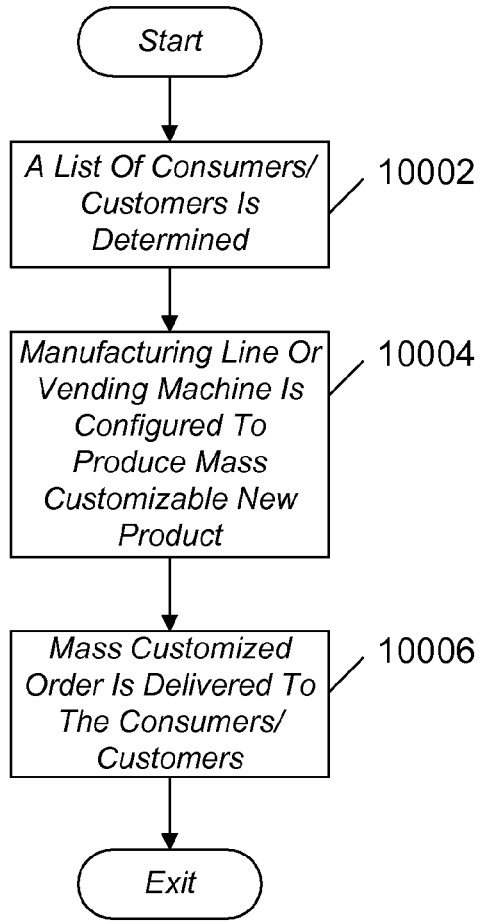
FIG. 12 illustrates one example of a method of marketing products by automatically identifying consumers, mass customizing new product launches, and delivering products to the consumers.

Referring to FIG. 12 there is illustrated one example of a method of marketing products by automatically identifying consumers, mass customizing new product launches, and delivering products to the consumers. In an exemplary embodiment, for example and not a limitation, consumers/customers 132 can be identified to receive product based on product criteria and/or marketing data 118. In this regard, product criteria and/or marketing data 118 can be utilized to query a consumer/customer 132 list by way of a data processing resource 112 and/or database 116. The consumer/customer 132 list can then be data communicated to the manufacturer/bottler 106 wherein a multiple stream filling system 200 can be utilized to mass customize orders for each of the consumers/customers 132 on the list. The completed orders can then be delivered to consumers/customers 132 destinations 108A-B of choice.

Alternatively, in an exemplary embodiment, for example and not a limitation, a consumer can be identified as being part the consumers/customers 132 list generated by the product criteria and/or marketing data 118 while at a vending machine 300. As such, the new product can be dispensed from the vending machine 300 to the consumer 132. The method begins in block 10002.

In block 10002 a list of consumers/customers 132 is determined. Processing then moves to block 10004. In block 10004 the manufacturing line or vending machine 300 is configured to produce the mass customizable new product or market offer. Processing then moves to block 10006. In block 10006 the mass customized order is delivered to a destination 108 or dispensed to the consumer/customer 132. The routine is then exited.

Figure 13:
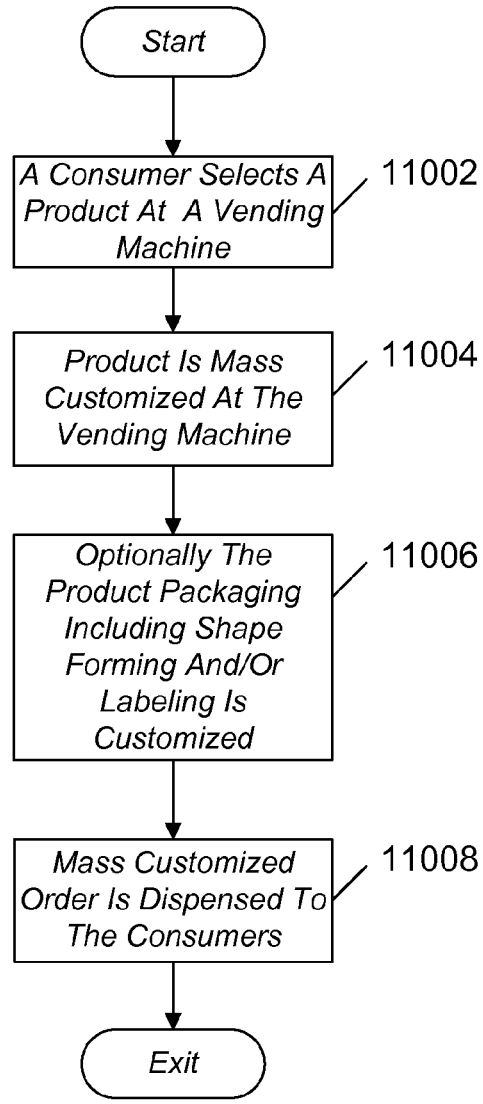
FIG. 13 illustrates one example of a method of allowing a consumer to select a product from a vending machine, mass customizing the product by way of micro-dosing and/or macro-dosing then dispensing the product to the consumer.

Referring to FIG. 13 there is illustrated one example of a method of allowing a consumer to select a product from a vending machine 300, mass customizing the product using one or more micro-dosed and/or macro-dosed ingredients, and then dispensing the product to the consumer 132. In an exemplary embodiment, for example and not a limitation, a vending machine 300 can comprise a multiple stream filling system 200. In this regard, a consumer 132 can order a custom product from the vending machine and the product can be manufactured by combining one or more micro-dosed and macro-dosed ingredients to formulate the consumer 132 specified products.

Ingredients in concentrated form can be stored in a vending machine and then combined as needed to form a wide variety of different products. Such wide variety offers consumers more choices. The method begins in block 11002.

In block 11002 a consumer selects a product at a vending machine 300. Processing then moves to block 11004. In block 11004 the consumer's product selection is mass customized using a multiple stream filling system 200. Processing then moves to block 11006. In block 11006 optionally the product packaging including shape forming and/or labeling is customized. In an exemplary embodiment, for example and not a limitation a dynamically changeable blow mold can be utilized to effectuate the shape forming of the mass customizable product packaging. In this regard, an oversized blow molder can comprise different blow molds for each desired product packaging shape. In operation, the preform feeder would be indexed to the blow molder and would only feed a preform when the corresponding product packaging shape is needed. This way, a stream of product packaging in the required sequence arrives at the multiple stream filling system 200. Processing then moves to block 11008. In block 11008 the mass customized order is dispensed to the consumer. The routine is then exited.

Referring to FIG. 14 there is illustrated one example of a method of receiving and filling a mass customizable promotional order. In an exemplary embodiment, a consumer/customer 132 may elect to place an order for a product from a business/ecommerce business 114. In this regard, the consumer/customer 132 can place such orders with the business 114 directly and/or by way of ecommerce. As example and not a limitation, network 104 and data processing equipment 112 and/or database 116 can be utilized as required and/or desired in a particular embodiment to effectuate ordering. In accordance with a cross promotion the ordering of a product from the business/ecommerce business 114 can trigger an order for a mass customized product from the manufacturer/bottler 106. Orders from both the business/ecommerce business 114 and the mass customized order from the manufacturer/bottler 106 can then be delivered to the consumer/customer 132 destination 108 of choice.

In an exemplary embodiment, such a promotional order originating from the business/ecommerce business 110 to the manufacturer/bottler 106 can be by way of an electronic order utilizing data processing device 112, database 116, and/or by other methods as may be required and or desired in a particular embodiment.

In an exemplary embodiment, for example and not a limitation, a business 114 could sell exercise shoes. A cross promotional relationship could exist between the business 114 and the manufacturer/bottler 106 such that for every order of exercise shoes a supply of invigorating sports drink manufactured by way of a multiple stream filling system 200 is supplied to the consumer. In operation, a consumer 132 could order shoes in person or online from the business 114. The order would generate a second order in accordance with the cross promotion agreement between the business 114 and the manufacturer/bottler 106. Optionally, the consumer 132 could intervene in the mass customized product specifications. The order for the shoes is processed by the business 114, and the mass customization by way of a multiple stream filling system 200 is produced by the manufacturer/bottler 106 and subsequently delivered to a customer 132 destination 108 of choice.

In an exemplary embodiment a first order can originate from a consumer/customer 132 by way of computing device 102A, personal computer (PC) 102B, and/or data processing device 102C. The first order can be received at a data processing resource 112. A second order can then be generated by way of the data processing resource 112 and received at a manufacturer/bottler 106. The first order can be processed by the business 114 and delivered to the consumer/customer 132. The second order can be processed by the manufacturer/bottler 106 who uses a multiple stream filling system 200 to produce the mass customized product referenced in the second order. The mass customized product is then delivered to the consumer/customer 132. The method begins in block 12002.

In block 12002 a promotional order is received at a manufacturer/bottler 106. Such order is received from a data processing resource 112 resultant from a consumer/customer 132 placing a first order. The first order then generates a second order also referred to as a promotional order with the manufacturer/bottler 106. Processing then moves to block 12004. In block 12004 a consumer 132 and a product are determined. Processing then moves to block 12006. In block 12006 optionally the product packaging including shape forming and/or labeling is customized. In an exemplary embodiment, for example and not a limitation a dynamically changeable blow mold can be utilized to effectuate the shape forming of the mass customizable product packaging. In this regard, an oversized blow molder can comprise different blow molds for each desired product packaging shape. In operation, the preform feeder would be indexed to the blow molder and would only feed a preform when the corresponding product packaging shape is needed. This way, a stream of product packaging in the required sequence arrives at the multiple stream filling system 200. Processing then moves to block 12008. In block 12008 the mass customized order is manufactured and shipped and/or delivered to the consumer/customer 132. The routine is then exited.

Referring to FIG. 15 there is illustrated one example of a method of effectuating a fundraising campaign between an organization and a number of consumers/customers 132 utilizing mass customizable product manufacturing. In an exemplary embodiment, for example and not a limitation, an organization 120 such as a school, team, event and/or other types and kinds of organizations can determine their own mass customizable products. In this regard, once the organization 120 determines their mass customizable products then consumers/customers 132 can place orders for the products. A data processing resource 112 and/or a database 116 can receive the organizations 120 mass customized product determinations and consumer/customer 132 orders.

In an exemplary embodiment, consumers/customers 132 can be local consumers and customer businesses and can be contacted by way of a marketing effort implemented by the organization 120. The data processing resource 112 can place orders with the manufacturer/bottler 106, wherein a multiple stream filling system 200 can produce the mass customized product determined by the organization 120. The product can then be delivered to the consumer/customer 132 destination 108 of choice. Portions of the proceeds can benefit the organization 120 as a fundraiser or other revenue producing activity. Such data processing as necessary can in part be effectuated by way of a network 104. The method begins in block 13002.

In block 13002 an organization determines a fundraising product. Processing then moves to block 13004. In block 13004 a number of consumers/customers 132 elect to buy the fundraising product. Processing then moves to block 13006. In block 13006 optionally the product packaging including shape forming and/or labeling is customized. In an exemplary embodiment, for example and not a limitation a dynamically changeable blow mold can be utilized to effectuate the shape forming of the mass customizable product packaging. In this regard, an oversized blow molder can comprise different blow molds for each desired product packaging shape. In operation, the preform feeder would be indexed to the blow molder and would only feed a preform when the corresponding product packaging shape is needed. This way, a stream of product packaging in the required sequence arrives at the multiple stream filling system 200. Processing then moves to block 13008. In block 13008 mass customized fundraiser product is manufactured and delivered to the consumer/customer 132. Processing then moves to block 13010. In block 13010 a portion of the proceeds is remitted to the organization. The routine is then exited.

Referring to FIG. 16 there is illustrated one example of a method of printing shipping information directly on the mass customized product packaging as preparation to shipping the product. In an exemplary embodiment, the product packaging containing the actual product can also be the shipping package. In this regard, shipping information and/or other indicia can be printed on the product packaging such that the product can be shipped to the consumer/customer 132 requiring no further packaging. The finished product can be deposited directly from the product manufacturing line for shipment to the consumer/customer 132.

In an exemplary embodiment, for example and not a limitation, a new product formulation can be configured on the mass customization manufacturing line such that a multiple stream filling system 200 can produce the product. In addition, a consumer/customer 132 list can be determined and during the manufacturing of the product the shipping information and/or other indicia related to the consumer/customer 132 list can be printed onto the product packaging. The mass customized products can then be directly deposited with a courier service for delivery to the consumers/customers 132 destination 108 of choice. The method begins in block 14002.

In block 14002 an order is received. Processing then moves to block 14004. In block 14004 a product shipping destination is determined. Processing then moves to block 14006. In block 14006 optionally the product packaging including shape forming and/or labeling is customized. In an exemplary embodiment, for example and not a limitation a dynamically changeable blow mold can be utilized to effectuate the shape forming of the mass customizable product packaging. In this regard, an oversized blow molder can comprise different blow molds for each desired product packaging shape. In operation, the preform feeder would be indexed to the blow molder and would only feed a preform when the corresponding product packaging shape is needed. This way, a stream of product packaging in the required sequence arrives at the multiple stream filling system 200. Processing then moves to block 14008. In block 14008 shipping information is printed on the product label. Processing then moves to block 14010. In block 14010 the mass customized order is manufactured and shipped. The routine is then exited.

Referring to FIG. 17 there is illustrated one example of a method of collecting marketing data and/or conducting market research by allowing consumers/customers 132 to mass customize products. In an exemplary embodiment, as consumers and customers order mass customized products their orders offer insight into marketing information such as shopping, buying, need states, and consuming habits. As such, the marketing information can be collected from orders and stored. The method begins in block 15002.

In block 15002 consumers/customers 132 are allowed to order mass customizable products. Processing then moves to block 15004. In block 15004 select mass customizable product information and/or consumer/customer 132 data is stored in a databases. Processing then moves to block 15006. The routine is then exited.

Figure 18:
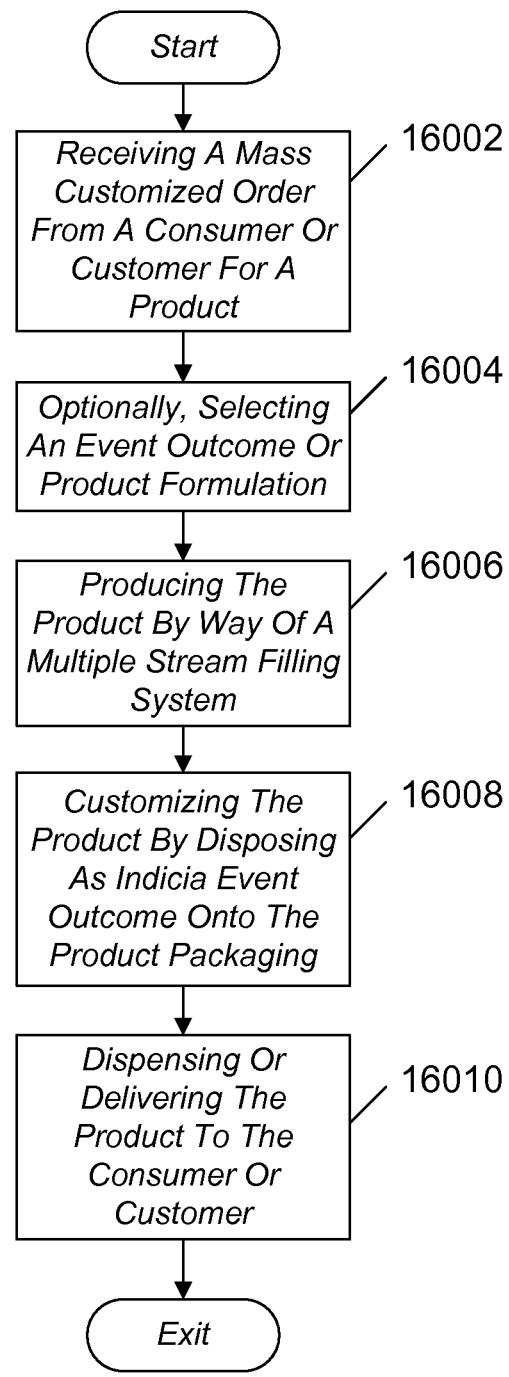
FIG. 18 illustrates one example of a method of customizing product packaging with event outcomes.

Referring to FIG. 18 there is illustrated one example of a method of customizing product packaging with event outcomes. In an exemplary embodiment, for example and not a limitation, outcomes from events such as sporting events, news events, and/or other events can be utilized during the mass customization process. In this regard, the current or final outcome of the event such as a race 122A, a football game 122B, and/or other types and kinds of events can be utilized during the mass customization process.

In an exemplary embodiment, data regarding an event 122 can be data communicated to a data processing resource 112 and/or database 116 by way of a network 104. A consumer/customer 132 utilizing vending machine 300 having the capability of mass customizing products can formulate the consumer/customer 132 product 126 of choice and during the product 126 manufacturing, customize the label with information related to the event 122.

As an example and not a limitation, if during a football championship game a certain team is leading at halftime, such data can be communicated to data processing resource 112. When a consumer then requests a customized beverage from vending machine 300 the label can be printed indicating that the certain team lead at halftime. Later at the conclusion of the race where the opposing team has won, consumers obtaining product 126 from the vending machine 300 will be treated to commemorative product packaging depicting the outcome of the championship game.

In another exemplary embodiment, consumers 132 can customize the product by selecting there favorite star or celebrity. Such favorite star or celebrity can be a sports figure, movie, and/or other types and kinds of favorite star or celebrity. The product 126 can then be manufactured and the product 126 packaging can be customized to indicate certain information about the star and/or celebrity.

As an example and not a limitation, at vending machine 300 a consumer 132 could select a cola beverage with vanilla flavoring and vitamins, and at the same time the consumer 132 may indicate their favorite basketball player. The vending machine by way of multiple stream filling system 200 can manufacture the beverage to the consumer's specifications and include on the product packaging information related to the basketball player.

In a number of events 122 commemorative products packaging depicting the event (during the event and/or final outcome) can be including at the time the product is being manufactured by a vending machine 300. In addition, such commemorative product 126 packaging depicting the event can optionally be ordered later by way of a manufacturer/bottler 106 and delivered to a destination 108 of the consumer/customer 132 choice.

In another exemplary embodiment, for example and not a limitation, optionally an event outcome can be selected from a database or other source of outcomes based in part on the formulation of the product selected and/or being produced.

In another exemplary embodiment, for example and not a limitation, optionally the formulation of the product can be selected based in part on the selected event outcome. In this regard, as example and not a limitation, the color of the product content can be optimized to correspond to the event outcome. As example, the color of the product contents can be formulated to be red in color for event outcomes associated with a particular sports team having red as a team color. Colors, flavoring, and/or other formulation elements can be optimized to correspond to the event outcome.

In an exemplary embodiment, event outcomes can be stored in a database, accessible by way of a global network based data processing resource, included as part of a mass customized order, and/or made available in other ways as may be required and or desired in a particular embodiment. The method begins in block 16002.

In block 16002 a mass customized order is received from a consumer or a customer 132 for a product. Processing then moves to block 16004. In block 16004 optionally, an event outcome is selected if not provided with the mass customized order. In addition, optional formulation of the product can either influence the selected event outcome, or the event outcome selected can influence the formulation of the product. In an exemplary embodiment, selecting event outcomes that correspond to formulation and vice versa can be used to optimize the consumer/customer 132 product occasion experiences. Such relationships between event outcomes and formulation can include, for example and not a limitation, matching team color, and/or selecting a formulation preferred by a team, personality, celebrity, organization and/or other match, correspondences, and/or preferences as may be required and/or desired in a particular embodiment. Processing then moves 16006. In block 16006 the product is produced by way of a multiple stream filling system. Processing then moves to block 16008. In block 16008 the product is customized by disposing as indicia event outcome onto the product packaging. In this regard, event outcome can be printed on the product packaging. In addition, consumer/customer 132 supplied text and or graphic indicia can also be disposed as indicia and/or otherwise printed onto the product packaging. Furthermore, one of a number of event outcomes can be selected to use on one of a number of products being manufactured. In this regard, event outcomes can be selected and changed as a number of products are being manufactured as may be required and/or desired in a particular embodiment. Processing then moves to block 16010. In block 16010 the product is dispensed or otherwise delivered to the consumer/customer 132. In this regard, dispensing can be by way of vending machine 300, or delivery can be to a destination 108 of choice. The routine is then exited.

The capabilities of the present application can be implemented in software, firmware, hardware or some combination thereof. As one example, one or more aspects of the present application can be included in an article of manufacture (e.g., one or more computer program products) having, for instance, computer readable media. The media has embodied therein, for instance, computer readable program code means for providing and facilitating the capabilities of the present application. The article of manufacture can be included as a part of a computer system or sold separately. Additionally, at least one program storage device readable by a machine, tangibly embodying at least one program of instructions executable by the machine to perform the capabilities of the present application can be provided. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While particular embodiments of methods of distributing customized products have been disclosed in detail in the foregoing description and figures for purposes of example, those skilled in the art will understand that variations and modifications may be made without departing from the scope of the disclosure. All such variations and modifications are intended to be included within the scope of the present disclosure, as protected by the following claims.

What is claimed is:

1. A method of creating customized beverage products, the method comprising:
   providing a multiple stream filing system suited for producing an array of beverage products;
   the multiple stream filling system comprising a continuous conveyor for moving a plurality of containers and a stationary nozzle manifold for dispensing a plurality of micro-ingredients through a plurality of nozzles into the plurality of containers as the plurality of containers move along the conveyor without stopping;

reading information from the plurality of containers by a reader as the plurality of containers moves down the conveyor, wherein the plurality of containers each comprise a unique identification readable by the reader to determine what to dispense in each of the plurality of containers;

receiving an order based on the information for a customized beverage product from the array of beverage products, the order indicating at least one characteristic of the customized beverage product, the at least one characteristic comprising one or more of the following: a beverage formulation, a beverage additive, a package size, a package shape, or label content; and instructing the multiple stream filing system to produce the customized beverage product based on the information from the reader, the multiple stream filing system producing the customized beverage product without performing an operation to reduce contamination of the customized beverage product with ingredients from a previously produced beverage product by separately dosing the plurality of micro-ingredients into the plurality of containers via the plurality of nozzles as the plurality of containers move along the conveyor without stopping, wherein receiving an order for a customized beverage product comprises receiving an order from a vehicle the method further comprising loading the plurality of beverage products onto the vehicle, wherein instructing the multiple stream filing system to produce the customized beverage product further comprises determining label content based at least in part on information received from the vehicle.

2. The method of claim 1, wherein receiving an order for a customized beverage product comprises receiving an order for a customized beverage product from a recipient via an internet website.

3. The method of claim 1, wherein:
receiving an order for a customized beverage product further comprises receiving label content to be printed on a label of the customized beverage product; and
instructing the multiple stream filing system to produce the customized beverage product further comprises instructing the multiple stream filing system to print the label content on the label.

4. The method of claim 1, wherein receiving an order for a customized beverage product comprises receiving health information associated with a recipient via an internet website.

5. The method of claim 4, wherein receiving an order for a customized beverage product further comprises determining an offered group of beverage products based at least in part on the health information.

6. The method of claim 5, wherein receiving an order for a customized beverage product further comprises receiving a selection from the recipient of the customized beverage product from among the offered group of beverage products.

7. The method of claim 1, wherein receiving an order for a customized beverage product comprises receiving an order from a third-party retailer via a network, a recipient of the customized beverage product being a customer of the third-party retailer.

8. The method of claim 1, further comprising determining an additional beverage product based at least in part on the customized beverage product, wherein instructing the multiple stream filing system to produce the customized beverage product further comprises instructing the multiple stream filing system to produce the additional beverage product.

9. The method of claim 8, wherein the additional beverage product is a line extension of the customized beverage product.

10. The method of claim 1, wherein instructing the multiple stream filing system to produce the customized beverage product further comprises determining a beverage formulation of the customized beverage product based at least in part information received from the vehicle.

11. The method of claim 1, wherein at least one of the plurality of micro-ingredients mixes with one or more macro-ingredients in the container.

* * * * *